US008913044B2

(12) United States Patent
Miyazawa

(10) Patent No.: US 8,913,044 B2
(45) Date of Patent: Dec. 16, 2014

(54) ELECTRONIC CIRCUIT, METHOD OF DRIVING THE SAME, ELECTRO-OPTICAL DEVICE, AND ELECTRONIC APPARATUS

(75) Inventor: Takashi Miyazawa, Hokuto (JP)

(73) Assignee: Intellectual Keystone Technology LLC, Wilmington, DE (US)

(*) Notice: Subject to any disclaimer, the term of this patent is extended or adjusted under 35 U.S.C. 154(b) by 673 days.

(21) Appl. No.: 12/757,551

(22) Filed: Apr. 9, 2010

(65) Prior Publication Data

US 2010/0194720 A1 Aug. 5, 2010

Related U.S. Application Data

(62) Division of application No. 11/379,009, filed on Apr. 17, 2006, now Pat. No. 7,724,245.

(30) Foreign Application Priority Data

Apr. 15, 2005 (JP) ................................ 2005-117873
Apr. 19, 2005 (JP) ................................ 2005-120774

(51) Int. Cl.
G06F 3/038 (2013.01)
G09G 5/00 (2006.01)
G09G 3/32 (2006.01)
H05B 33/08 (2006.01)

(52) U.S. Cl.
CPC .......... H05B 33/0896 (2013.01); G09G 3/3233 (2013.01); G09G 2300/0814 (2013.01); G09G 2320/043 (2013.01); G09G 2300/0465 (2013.01); G09G 2300/0861 (2013.01); G09G 2300/0876 (2013.01); Y02B 20/36 (2013.01)
USPC ................................ 345/204; 345/76; 345/82

(58) Field of Classification Search
CPC .............................................. G09G 2300/0404
See application file for complete search history.

(56) References Cited

U.S. PATENT DOCUMENTS 5,631,473 A * 5/1997 Possin et al. .................... 257/59
6,730,966 B2 5/2004 Koyama
(Continued)

FOREIGN PATENT DOCUMENTS

CN 1417767 A 5/2003
CN 1460240 A 12/2003
(Continued)

OTHER PUBLICATIONS

Choi, S. M., et al., "A Self-Compensated Voltage Programming Pixel Structure for Active-Matrix Organic Light Emitting Diodes," IDW'03, Dec. 3, 2003, pp. 535-538.

(Continued)

Primary Examiner — Amare Mengistu
Assistant Examiner — Antonio Xavier
(74) Attorney, Agent, or Firm — Sughrue Mion, PLLC

(57) ABSTRACT

At a writing time, a first transistor 412 is turned on so that a data signal Xj is supplied to one end of a capacitor 420. At this time, since a second transistor 414 is turned off, driving current does not flow to an organic light emitting diode (OLED) device 430. A power supply voltage Vdd is supplied to the other end of a capacitor through a power supply line L. However, since the driving current does not flow at the writing time, the power supply voltage Vdd is not reduced by the wiring line resistance of the power supply line L. On the other hand, at an emission time, the first transistor 412 is turned off and the second transistor 414 is turned on. Therefore, the driving current is supplied to the OLED device 430.

5 Claims, 15 Drawing Sheets

(56) References Cited

U.S. PATENT DOCUMENTS

| | | | |
|---|---|---|---|
| 6,919,871 | B2 | 7/2005 | Kwon |
| 6,982,462 | B2 | 1/2006 | Koyama |
| 7,123,220 | B2 | 10/2006 | Hanari et al. |
| 7,154,454 | B2 | 12/2006 | Okabe et al. |
| 7,277,071 | B2 * | 10/2007 | Oh .................. 345/76 |
| 7,324,101 | B2 | 1/2008 | Miyazawa |
| 7,358,942 | B2 | 4/2008 | Yamazaki et al. |
| 7,525,119 | B2 | 4/2009 | Koyama |
| 7,528,808 | B2 | 5/2009 | Tam |
| 2002/0011799 | A1 * | 1/2002 | Kimura ............ 315/169.3 |
| 2003/0063053 | A1 * | 4/2003 | Yamazaki et al. ........ 345/82 |
| 2003/0098829 | A1 * | 5/2003 | Chen et al. ............. 345/82 |
| 2003/0103022 | A1 | 6/2003 | Noguchi et al. |
| 2003/0142509 | A1 | 7/2003 | Tsuchiya et al. |
| 2004/0095338 | A1 * | 5/2004 | Miyazawa ............ 345/204 |
| 2004/0130513 | A1 * | 7/2004 | Miyazawa ............. 345/76 |
| 2004/0189615 | A1 * | 9/2004 | Osame et al. .......... 345/173 |
| 2004/0251953 | A1 * | 12/2004 | Yamazaki et al. ....... 327/512 |
| 2004/0252565 | A1 * | 12/2004 | Yamazaki et al. ....... 365/202 |
| 2005/0185108 | A1 * | 8/2005 | Chen ................... 349/43 |
| 2005/0206593 | A1 | 9/2005 | Kwon |
| 2005/0265071 | A1 * | 12/2005 | Kwon ................. 365/154 |
| 2006/0214891 | A1 | 9/2006 | Hanari et al. |
| 2006/0290617 | A1 | 12/2006 | Miyazawa |
| 2008/0169765 | A1 | 7/2008 | Yamazaki et al. |
| 2009/0102777 | A1 * | 4/2009 | Izumikawa et al. ........ 345/96 |
| 2009/0218573 | A1 | 9/2009 | Koyama |

FOREIGN PATENT DOCUMENTS

| | | |
|---|---|---|
| CN | 1494048 A | 5/2004 |
| CN | 1534568 A | 10/2004 |
| JP | A-2002-149112 | 5/2002 |
| JP | A-2003-108073 | 4/2003 |
| JP | A-2003-150105 | 5/2003 |
| JP | A-2003-255899 | 9/2003 |
| JP | A-2004-246204 | 9/2004 |
| JP | A-2005-037415 | 2/2005 |
| JP | B2-4289311 | 9/2005 |
| KR | 10-2004-0067029 A | 7/2004 |
| WO | WO 2004/047061 A2 | 6/2004 |

OTHER PUBLICATIONS

Sang-Moo Choi et al, "P-11: An Improved Voltage Programmed Pixel Structure for Large Size and High Resolution AM-OLED Displays", SID Symposium Digest of Technical Papers, May 25, 2004, vol. 35, Issue 1, pp. 260-263).

Interrogation dated Dec. 13, 2011 in counterpart Japanese Patent Application No. 2005-117873 with translation.

Tanada et al. "51.2: A 4.3-in. VGA (188 ppi) AMOLED Display with a New Driving Method." SID 04 Digest, 2004 (pp. 1398-1401).

Tam et al. "51.4: Invited Paper: Modelling and Design of Polysilicon Drive Circuits for OLED Displays." SID 04 Digest, 2004 (pp. 1406-1409).

* cited by examiner

[SECOND TIME T$_2$ (WRITING TIME T$_{WRT}$)]

[EMISSION TIME T$_{EL}$]

[FIRST TIME T$_1$ (WRITING TIME T$_{WRT}$)]

[SECOND TIME T$_2$ (WRITING TIME T$_{WRT}$)]

[EMISSION TIME T$_{EL}$]

ELECTRONIC CIRCUIT, METHOD OF DRIVING THE SAME, ELECTRO-OPTICAL DEVICE, AND ELECTRONIC APPARATUS

This application is a division of U.S. patent application Ser. No. 11/379,009, filed Apr. 17, 2006, and claims priority to Japanese Patent Application No. 2005-117873 filed in Japan on Apr. 15, 2005 and Japanese Patent Application No. 2005-120774 filed in Japan on Apr. 19, 2005, the entire contents of which are hereby incorporated herein by reference.

TECHNICAL FIELD

The present invention relates to an electronic circuit used for driving a driven device such as an electro-optical device represented by, for example, a light emitting diode, a method of driving the same, an electro-optical device, and an electronic apparatus.

BACKGROUND ART

Recently, an organic light emitting diode (hereinafter, referred to as OLED) device referred to as an organic electroluminescence device or a light emitting polymer device is spotlighted as a next generation light emitting device that replaces a liquid crystal display (LCD). Since the OLED device is of a spontaneous emission type, the OLED device is little dependent on a viewing angle. Also, since the OLED device does not need a back light or reflection light, the OLED device consumes a small amount of power and can be made thin. Therefore, the OLED device has excellent characteristics as a display panel.

Here, a common OLED device is a current driven device that cannot maintain an emission state when current is not supplied since the OLED device does not have a voltage maintaining property unlike the LCD. Therefore, when the OLED device is driven in an active matrix method, a data voltage in accordance with the gradation of a pixel is recorded in the gate of a driving transistor at a writing time so that the corresponding data voltage is maintained by a capacitor and that the driving transistor continuously flows current in accordance with the corresponding gate voltage to the OLED device.

In the above-described voltage recording method, the data voltage is recorded at the writing time. In this process, when the data voltage is larger than the threshold voltage of the driving transistor, driving current flows to the OLED device. Since wiring line resistance is provided in a power supply line, when the driving current flows, the electric potential of the power supply line changes. However, in the case where one terminal of the capacitor and the source of the driving transistor are connected to the power supply line, when the electric potential of the power supply line changes at the writing time, the voltage maintained in both ends of the capacitor changes so that light cannot be emitted by the OLED device with correct brightness at an emission time.

In order to solve the above-described problem, it is an object of the present invention to provide an electronic circuit that is capable of correctly setting the conduction state of the driving transistor and the brightness of the electro-optical device when a data signal such as the data voltage is recorded, a method of driving the same, an electronic device, a light emitting device, and an electronic apparatus.

DISCLOSURE OF INVENTION

An electronic circuit for driving a driven device includes a driving transistor whose conduction state is set in accordance with a data voltage supplied through a data line so that the conduction state corresponds to the current level of the driving current supplied to the driven device, a capacitor whose one end is connected to the gate of the driving transistor and whose the other end is connected to a power supply line, a first switching device for controlling electric connection between the data line and the driving transistor, and a second switching device serially connected to the driving transistor. The driving current is supplied to the driven device in at least a part of the time at which the second switching device is turned on and the driving current is intercepted in at least a part of the time at which the second switching device is turned off. According to the electronic circuit, the first switching device is turned on so that the data voltage can be written in the capacitor. Since the power supply line has wiring line resistance, when the driving current flows at the time when the data voltage is written, the power supply voltage is reduced. In the electronic circuit, the second switching device is provided on the path through which the driving current is supplied to the driven device. The electro-optical device such as the light emitting device may be used as the driven device. At the time when the data voltage in accordance with the driving current is written in the capacitor, the second switching device is turned off so that the path for supplying the driving current can be intercepted. Therefore, it is possible to prevent the power supply voltage from being reduced so that it is possible to correctly write the data voltage in both ends of the capacitor. Also, any device that emits light with the brightness in accordance with the driving current or the driving voltage, for example, an organic light emitting diode or an inorganic light emitting diode can be used as the light emitting device.

To be specific, the first switching device is preferably turned on at a writing time when the data voltage is input and is turned off in at least a part of a driving time at which the driving current is supplied to the driven device and the second switching device is preferably turned off in at least a part of the writing time and is preferably turned on in at least a part of the driving time. In this case, the path through which the driving current is supplied is intercepted in at least a part or all of the writing time and the path through which the driving current is supplied is formed in at least a part or all of the driving time. Therefore, it is possible to prevent the power supply voltage from being reduced in at least a part or all of the writing time. Also, a part of the writing time preferably includes the ending point of time of the writing time. Therefore, the second switching device can be turned off at the ending point of time of the writing time.

An idle time preferably exists between the writing time and the driving time and the first switching device and the second switching device are preferably turned off in the idle time. In this case, since it is transited from the writing time to the emission time through the idle time, it is possible to form a margin at the timing when the power supply voltage is reduced. As a result, it is possible to prevent the power supply voltage from being reduced at the writing time.

Two aspects of the first and second switching devices are provided. According to a first aspect, the driving current flows between the driven device and the power supply line through the driving transistor, the first switching device is a first transistor, the second switching device is a second transistor provided between the power supply line and one end of the driving transistor, and the other end of the driving transistor is connected to the driven device.

According to a second aspect, the driving current flows between the driven device and the power supply line through the driving transistor, the first switching device is a first transistor, the second switching device is a second transistor provided between one end of the light emitting device and one end of the driving transistor, and the other end of the driving transistor is connected to the power supply line. According to any aspect, since the second transistor is provided on the path through which the driving current is supplied to the light emitting device, the turning on and off of the second transistor is controlled so that it is possible to prevent the driving current from flowing at the writing time.

Next, there is provided a method of driving an electronic circuit including a driven device, a driving transistor provided between a power supply line and the driven device, and a capacitor whose one end is connected to the gate of the driving transistor and whose the other end is connected to the power supply line at a writing time and a driving time. A data voltage is supplied to one end of the capacitor at the writing time and the driven device is electrically insulated from the power supply line in at least a part of the writing time. The data voltage written at the writing time is maintained, the conduction state of the driving transistor is set by the data voltage, and driving current having the current level in accordance with the conduction state is supplied to the driven device at the driving time. According to the method of driving the electronic circuit, the data voltage is supplied to one end of the capacitor at the writing time. However, since the path through which the driving current flows to the light emitting device is intercepted at the corresponding time, the power supply voltage does not change at the writing time. Therefore, it is possible to correctly write the data voltage. In the above-described method, it is preferable that the driving transistor is electrically insulated from the power supply line to electrically insulate the driven device from the power supply line. Also, in the above-described method, an idle time is preferably formed between the writing time and the driving time, writing the data voltage in the capacitor is preferably stopped, the data voltage written at the writing time is preferably maintained, and a path through which the driving current is supplied to the driven device is preferably intercepted in the idle time. In this case, since the idle time is formed in the process of transiting from the writing time to the emission time, it is possible to form a margin at the timing when the driving current is supplied to the light emitting device.

Next, there is provided an electro-optical device including a plurality of scan lines, a plurality of data lines, a plurality of power supply lines that intersect the plurality of data lines, and a plurality of pixel circuits provided to correspond to the intersections between the plurality of data lines and the plurality of scan lines. Each of the plurality of pixel circuits includes an electro-optical device, a driving transistor whose conduction state is set in accordance with a data voltage supplied through one data line of the plurality of data lines and that has a first gate, a capacitor whose one end is connected to the first gate and whose the other end is connected to one power supply line of the plurality of power supply lines, a first transistor having a second gate and provided between the data line and the first gate so that the second gate is connected to one scan line of the plurality of scan lines, and a second transistor having a third gate and serially connected to the driving transistor. The second transistor is turned off in at least a part of a time at which the first transistor is turned on.

When the power supply lines are arranged along the data lines to intersect the scan lines, in the case where a scan line is selected to write the data voltage in the pixel circuit corresponding to the intersection between the corresponding scan line and a data line, although the path of the driving current is intercepted at the writing time, since the driving current may be supplied to the electro-optical device in the other pixel circuits connected to the corresponding power supply line, the power supply voltage is reduced. According to the above-described electro-optical device, the power supply lines are arranged along the scan lines to intersect the data lines. When the scan lines are arranged in the row direction, a plurality of pixel circuits arranged in a row are connected to a power supply line. When a scan line is selected, data voltages are input from the data lines to all of the pixel circuits arranged in the corresponding scan line. At this time, since the first transistor is turned on and the second transistor is turned off, in all of the pixel circuits connected to a power supply line, at the writing time, the path through which the driving current is supplied to the light emitting device is intercepted. That is, one power supply line is provided to the plurality of pixel circuits that are simultaneously at the writing time. Therefore, it is possible to prevent the power supply voltage of the power supply line from being reduced so that it is possible to correctly write the data voltages in the pixel circuits, respectively. Also, the electro-optical device means a device whose optical characteristic changes by an electric operation. For example, the light emitting device such as the OLED corresponds to the electro-optical device.

Next, there is provided another electro-optical device including a plurality of scan lines, a plurality of data lines, a plurality of pixel circuits provided to correspond to the intersections between the plurality of scan lines and the plurality of data lines, a plurality of power supply lines that intersect the plurality of data lines, and a plurality of control lines that intersect the plurality of data lines. Each of the plurality of pixel circuits includes an electro-optical device, a driving transistor for controlling the current level of a driving current supplied to the electro-optical device, a capacitor whose one end is connected to the first gate of the driving transistor and whose the other end is connected to one power supply line of the plurality of power supply lines, a first transistor having a second gate and provided between one data line of the plurality of data lines and the first gate so that the second gate is connected to one scan line of the plurality of scan lines and that the first transistor is turned on when a scan signal supplied through the scan line is activated and is turned off when the scan signal is deactivated, and a second transistor having a third gate and serially connected to the electro-optical device so that the third gate is connected to one control line of the plurality of control lines and that the second transistor is turned on when a control signal supplied through the control line is activated and is turned off when the control signal is deactivated. The control signal is deactivated in at least one of the time at which the scan signal is activated.

According to the above-described electro-optical device, the time at which the control signal is deactivated overlaps the time at which the scan signal is activated. Therefore, the first and second transistors can be turned off in the process of transiting from the writing time at which the scan signal is activated so that the data voltage is written in the pixel circuit to the driving time at which the control signal is activated so that the driving current is supplied to the electro-optical device. Therefore, it is possible to prevent the power supply voltage from being reduced in the writing time.

Here, the control signal is preferably deactivated at the point of time when the scan signal is transited to be deactivated. Also, the time at which the control signal is deactivated is preferably larger than the time at which the scan signal is activated. Also, since floating capacity and distribution resistance are provided in the scan line, when the scan signal is supplied from one end of the scan line, the scan signal supplied to the pixel circuit in the other end may be compared with the scan signal supplied to the pixel circuit in one end to be transmitted. When the writing operation and the driving operation are exclusively performed, the pixel circuit in one end may be at the driving time meanwhile the pixel circuit in the other end is at the writing time. When the idle time is formed in such a case, in the case where an arbitrary pixel circuit connected to a power supply line is at the writing time, it is possible to prevent the other pixel circuit is at the driving time. In this case, the length of the idle time formed between the writing time and the driving time is preferably larger than the delay time of the scan signal.

There is provided another electronic circuit including a driving transistor (for example, the driving transistor Qdr of FIG. 10) including a first terminal, a second terminal, and a gate terminal and controlling electric connection between a power supply line and the driven device so that the current level of the driving current that flows between the first terminal and the second terminal changes in accordance with the voltage of the gate terminal, a capacitor (for example, the capacitor C0 of FIG. 10) including a first electrode (for example, the first electrode L0a of FIG. 10) connected to the gate terminal and a second electrode (for example, the second electrode L0b of FIG. 10) connected to the power supply line, a first switching device (for example, the first transistor Qa1 of FIG. 10) for controlling electric connection between the first terminal of the driving transistor and the power supply line, a second switching device (for example, the second transistor Qa2 of FIG. 10) for controlling electric connection between the first terminal or the second terminal of the driving transistor and the gate terminal of the driving transistor, and a third switching device (for example, and the third transistor Qa3 of FIG. 10) for controlling electric connection between the data line to which the data voltage is supplied and the second terminal of the driving transistor. A detailed example of the structure will be described later (in particular, with reference to FIG. 10).

According to the structure, the second switching device and the third switching device are turned on (conduction state) at the writing time so that the data voltage is written in the capacitor. At the writing time, when the driving current flows from the driving transistor to the light emitting device, the power supply voltage of the power supply line is reduced. According to the above-described electronic circuit, since the electric connection between the driving transistor and the power supply line is switched by the first switching device, at the writing time, the first switching device is turned off (non-conduction state) so that the path of the driving current can be intercepted. Therefore, according to the present invention, it is possible to prevent the power supply voltage from being reduced so that it is possible to write a desired voltage in the capacitor at a high precision degree.

Also, in the above-described electronic circuit, a fourth switching device (for example, the fourth transistor Qa4 of FIG. 10) for controlling electric connection between a wiring line to which a predetermined voltage is applied and the gate terminal of the driving transistor may be further provided. In the above structure, when the fourth switching device is turned on before the data voltage is applied from the data line to the second terminal of the driving transistor through the third switching device, since it is possible to set the voltage of the gate terminal of the driving transistor to a predetermined voltage before writing in the data voltage, it is possible to rapidly and effectively write the data voltage.

There is provided another electronic circuit including a driving transistor (for example, the driving transistor Qdr of FIG. 15) including a first terminal, a second terminal, and a gate terminal and controlling electric connection between a power supply line and the driven device so that the current level of the driving current that flows between the first terminal and the second terminal changes in accordance with the voltage of the gate terminal, a first capacitor (for example, the first capacitor C1 of FIG. 15) including a first electrode L1a and a second electrode L1b so that the first electrode is connected to the gate terminal, a second capacitor (for example, the second capacitor C2 of FIG. 15) including a third electrode L2a and a fourth electrode L2b so that the fourth electrode is connected to the power supply line, a first switching device (for example, the first transistor Qb1 of FIG. 15) for controlling electric connection between the first terminal of the driving transistor and the power supply line, a second switching device (for example, the second transistor Qb2 of FIG. 15) for controlling electric connection between the first terminal or the second terminal of the driving transistor and the gate terminal of the driving transistor, and a third switching device (for example, the third switching device Qb3 of FIG. 15) for controlling electric connection between the data line to which the data voltage is supplied and the second electrode of the first capacitor.

The aspect will be described later. In the above structure, at the writing time when the data line and the second electrode of the second capacitor are electrically connected to each other by the third switching device, the path of the driving current that is transmitted from the power supply line to the light emitting device through the driving transistor may be intercepted by the first switching device. Therefore, it is possible to prevent the power supply voltage from being reduced so that it is possible to write a desired voltage in the capacitor at a high precision degree. Also, in the above structure, the voltage of the gate terminal is affected by the change in the voltage of the fourth electrode by the capacity coupling that is performed by the second capacitor. For example, as illustrated in FIG. 15, the first electrode and the third electrode are connected to the gate terminal.

The first switching device is turned off at the writing time when the data voltage is supplied to the second electrode of the first capacitor through the third switching device and is turned on at the driving time when the driving current is supplied to the driven device. According to the aspect, since the first switching device is turned off at the writing time, it is possible to prevent the power supply voltage from being reduced at the writing time.

According to a preferable aspect of the electronic circuit, a fifth switching device (for example, the emission control transistor Qe1 of FIG. 10 or 15) for controlling electric connection between the second terminal of the driving transistor and the driven device is provided. The fifth switching device is turned off at the writing time when the data voltage is supplied to the second electrode of the first capacitor and is turned on at the driving time when the driving current is supplied to the driven device. According to the aspect, it is possible to control the interception and formation of the path of the driving current by the emission control switching device in addition to the first switching device.

There is provided a method of driving an electronic circuit for driving a driven device, the electronic circuit including a driving transistor having a first terminal, a second terminal, and a gate terminal so that the current level of the driving current that flows between the first terminal and the second terminal changes in accordance with the voltage of the gate terminal and a capacitor having a first electrode connected to the gate terminal of the driving transistor and a second electrode connected to a power supply line, at the writing time, the first terminal or the second terminal of the driving transistor and the gate terminal of the driving transistor are electrically connected to each other and the data voltage is supplied to the second terminal of the driving transistor so that the conduction state of the driving transistor is set. At the driving time after the writing time, the driving current of the current level in accordance with the conduction state of the driving transistor that is set at the writing time is supplied to the driven device. At the writing time, the driven device is electrically insulated from the power supply line.

In other words, at the driving time after the writing time, the driving current of the current level in accordance with the conduction state of the driving transistor that is set at the writing time is supplied from the power supply line to the driven device. At least at the ending point of time of the writing time, the driven device is electrically insulated from the power supply line. Such an aspect will be described later. According to the driving method, at the writing time, since the supply of the driving current is stopped, the electric potential of the power supply line does not change. Therefore, it is possible to correctly set the data voltage or the difference Vgs in the electric potential between the data voltage and the source voltage.

There is provided another method of driving an electronic circuit including a driving transistor having a first terminal, a second terminal, and a gate terminal and controlling electric connection between a power supply line and a driven device so that the current level of the driving current that flows between the first terminal and the second terminal changes in accordance with the voltage of the gate terminal, a first capacitor having a first terminal and a second terminal so that the first electrode is connected to the gate terminal, and a second capacitor having a third electrode and a fourth electrode so that the fourth electrode is connected to a power supply line. At the writing time, the first terminal or the second terminal of the driving transistor and the gate terminal of the driving transistor are electrically connected to each other and a data voltage is supplied to the second electrode of the first capacitor. At the driving time after the writing time, the driving current of the current level in accordance with the conduction state of the driving transistor that is set at the writing time is supplied from the power supply line to the driven device. In at least a part of the writing time, the driven device is electrically insulated from the power supply line. A detailed example of the aspect will be described later with reference to FIGS. 15 and 21. According to the present invention, like in the above driving method, it is possible to correctly set the data voltage or the difference Vgs in the electric potential between the data voltage and the source voltage.

According to the driving method, at the writing time, the switching device interposed between the driving transistor and the power supply line is turned off to intercept the path or the switching device interposed between the driving transistor and the light emitting device is turned off to intercept the path. According to such an aspect, it is possible to simply and certainly control the interception and formation of the path of the driving current by controlling the switching device.

In a preferable aspect of the driving method according to the present invention, an idle time is set between a writing time and a driving time (for example, refer to FIG. 20 or 22). At the idle time, electric connection between the second electrode of the first capacitor and the data line is intercepted and the path through which the driving current is supplied from the power supply line to the light emitting device is intercepted. That is, at the idle time, neither the data voltage is written nor the driving current is supplied to the light emitting device. According to the aspect, it is possible to prevent the writing of the data voltage and the supply of the driving current to the light emitting device from overlapping each other. Therefore, it is possible to prevent the power supply voltage from changing at the writing time so that it is possible to certainly write the data voltage in the electronic circuit. Also, at the idle time between the writing time and the driving time, the second electrode of the first capacitor may float.

There is provided an electro-optical device including a plurality of scan lines, a plurality of data lines, a plurality of electronic circuits arranged to correspond to the intersections between the plurality of scan lines and the plurality of data lines, a plurality of power supply lines, a scan line driving circuit for driving the plurality of scan lines, and a data line driving circuit for driving the plurality of data lines. The electronic circuits that belong to one group among the plurality of electronic circuits are connected to the plurality of power supply lines. Each of the plurality of electronic circuits includes an electro-optical device, a driving transistor having a first terminal, a second terminal, and a gate terminal and controlling electric connection between the power supply line and the driven device so that the current level of the driving current that flows between the first terminal and the second terminal changes in accordance with the voltage of the gate terminal, a capacitor having a first electrode and a second electrode so that the first electrode is connected to the gate terminal, a first switching device for controlling electric connection between the first terminal of the driving transistor and the power supply line, a second switching device for controlling electric connection between the first terminal or the second terminal of the driving transistor and the gate terminal of the driving transistor, and a third switching device for controlling electric connection between the data line to which the data voltage is supplied and the second terminal of the driving transistor. The same effect as the electronic circuit has is obtained by the electro-optical device. Also, a detailed example of the structure will be described later with reference to FIG. 10.

There is provided another electro-optical device including a plurality of scan lines, a plurality of data lines, a plurality of electronic circuits arranged to correspond to the intersections between the plurality of scan lines and the plurality of data lines, a plurality of power supply lines, a scan line driving circuit for driving the plurality of scan lines, and a data line driving circuit for driving the plurality of data lines so that electronic circuits that belong to one group among the plurality of electronic circuits are connected to the plurality of power supply lines. Each of the plurality of electronic circuits includes an electro-optical device, a driving transistor having a first terminal, a second terminal, and a gate terminal and controlling electric connection between the power supply line and the driven device so that the current level of the driving current that flows between the first terminal and the second terminal changes in accordance with the voltage of the gate terminal, a first capacitor having a first electrode and a second electrode so that the first electrode is connected to the gate terminal, a second capacitor having a third electrode and a fourth electrode so that the fourth electrode is connected to the power supply line, a first switching device for controlling electric connection between the second terminal and one power supply line of the plurality of power supply lines, a second switching device for controlling electric connection between the first terminal or the second terminal of the driving transistor and the gate terminal of the driving transistor, and a third switching device for controlling electric connection between the data line to which the data voltage is supplied and the second electrode of the first capacitor. A detailed example of the aspect will be described with reference to FIG. 15. It is possible to prevent the power supply voltage of each of the power supply lines from changing by the above electro-optical device so that it is possible to correctly write the data voltage in each of the electronic circuits.

According to the above-described electro-optical devices, the plurality of power supply lines preferably intersect the plurality of data lines. According to the aspect, since the plurality of electronic circuits (that is, the electronic circuits that write the data voltages at the same time) are connected to the common power supply line, it is possible to prevent the power supply voltage from changing in the power supply line to which the electronic circuits are connected at the writing time. Therefore, it is possible to correctly set the data voltage or the difference Vgs in the electric potential between the data voltage and the source voltage with respect to each of the electronic circuits.

There is another electro-optical device including a plurality of scan lines, a plurality of data lines, a plurality of electronic circuits arranged to correspond to the intersections between the plurality of scan lines and the plurality of data lines, a plurality of power supply lines that intersect the plurality of data lines, a scan line driving circuit for driving the plurality of scan lines, and a data line driving circuit for driving the plurality of data lines so that electronic circuits that belong to one group among the plurality of electronic circuits are connected to the plurality of power supply lines. Each of the plurality of electronic circuits includes an electro-optical device, a driving transistor having a first terminal, a second terminal, and a gate terminal so that the current level of the driving current that flows between the first terminal and the second terminal changes in accordance with the voltage of the gate terminal, a first capacitor having a first electrode and a second electrode so that the first electrode is connected to the gate terminal of the driving transistor, a second capacitor having a third electrode and a fourth electrode so that the fourth electrode is connected to the power supply line, a first switching device for controlling electric connection between the first terminal or the second terminal of the driving transistor and the gate terminal of the driving transistor, and a second switching device for controlling electric connection between the data line and the second electrode of the first capacitor. After the first switching device is turned on, in at least a part of the time at which the second switching device is turned on, the data voltage is supplied to the second electrode through the second switching device so that the conduction state of the driving transistor is set. In accordance with the conduction state of the driving transistor, the current level of the driving current supplied from each of the power supply lines to the light emitting device is set. After the termination of the time at which the data voltage is supplied to the second electrode until the supply of the driving current to the electro-optical device starts, the electro-optical device may be electrically separated from the power supply line.

The electro-optical device according to the present invention is used for various electronic apparatuses. According to a typical example of the electronic apparatus, the electro-optical device is used as a display. Such an electronic apparatus includes a personal computer and a mobile telephone. The purpose of the electro-optical device according to the present invention is not limited to display of an image. For example, the electro-optical device according to the present invention can be used as an exposing device for forming a latent image in an image carrier such as a photosensitive drum by radiating a beam.

Next, the electronic apparatus according to the present invention preferably includes the above-described electro-optical device. Such an electronic apparatus includes a large display to which a plurality of panels are connected, a personal computer, a mobile telephone, and a portable information terminal.

BEST MODE FOR CARRYING OUT THE INVENTION

Figure 1:
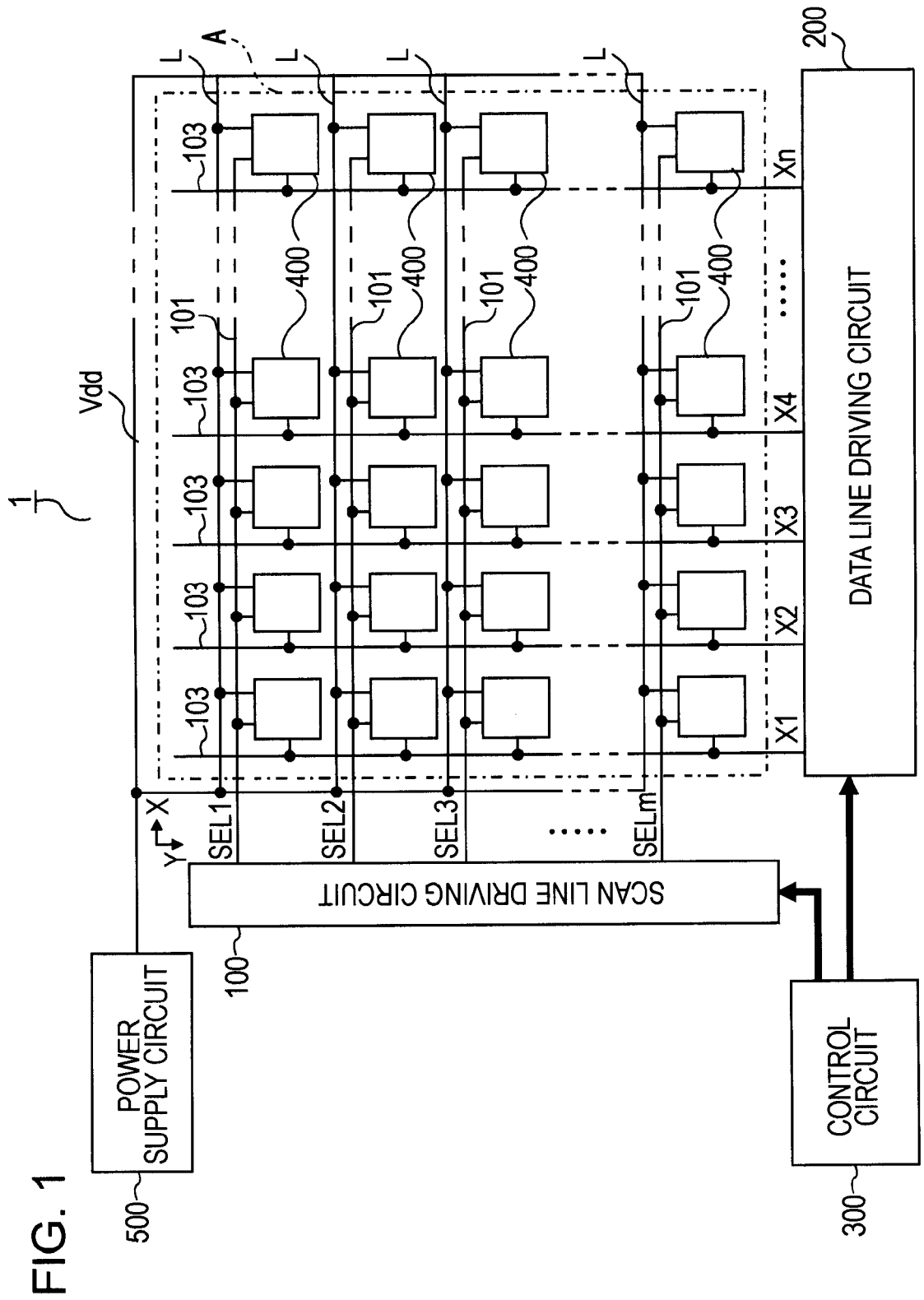
FIG. 1 is a block diagram illustrating the structure of a light emitting device according to an embodiment of the present invention.
Figure 2:
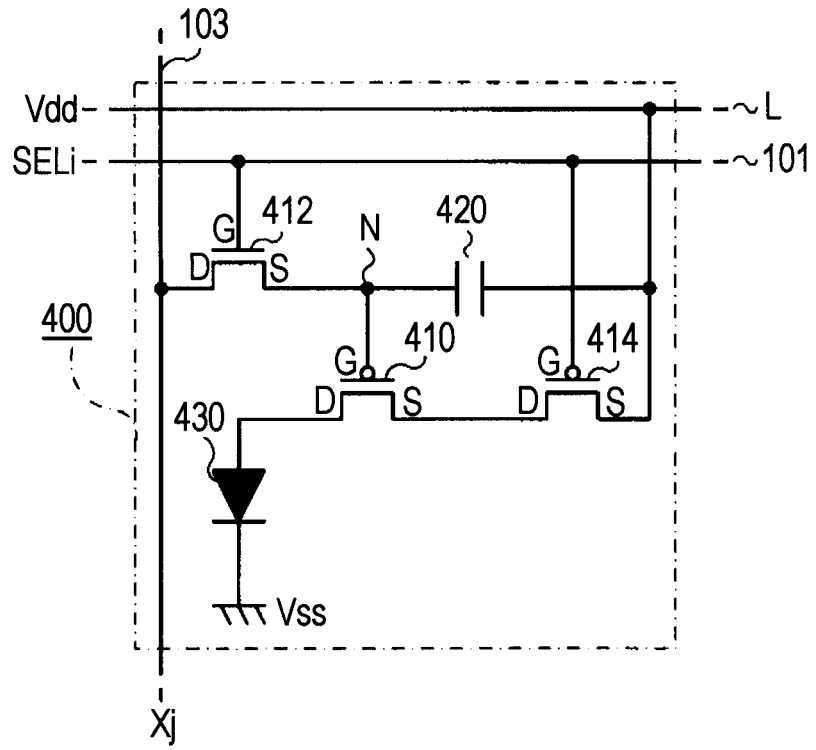
FIG. 2 is a circuit diagram illustrating the pixel circuit of the light emitting device.

FIG. 1 is a block diagram illustrating the schematic structure of an electro-optical device including an organic electroluminescence (EL) device (hereinafter, referred to as an OLED device) according to an embodiment of the present invention. FIG. 2 is a circuit diagram of a pixel circuit. As illustrated in FIG. 1, a light emitting device 1 includes a pixel area A, a scan line driving circuit 100, a data line driving circuit 200, a control circuit 300, and a power supply circuit 500. Among them, m scan lines 101 and m power supply lines L that run parallel to the X direction are formed in the pixel area A. Also, n data lines 103 that run parallel to the Y direction that intersects the X direction are formed. One pixel circuit 400 is provided to correspond to each of the intersections between the scan lines 101 and the data lines 103. The pixel circuit 400 includes an OLED device 430. A high electric potential power supply voltage Vdd as a power supply voltage is supplied to the pixel circuits 400 through the power supply lines L. The scan line driving circuit 100 supplies scan signals SEL1 to SELm to the scan lines 101, respectively. To be specific, the scan line driving circuit 100 selects the scan lines 101 by one row every one horizontal scan time to sequentially supply the scan signals SEL1 to SELm in response to the selection. Hereinafter, the scan signal supplied to the ith (i is a natural number selected from 1 to m) scan line 101 is denoted by SELi.

The data line driving circuit 200 supplies a data signal having a voltage in accordance with the voltage level of a driving voltage or the current level of a driving current to be supplied to the OLED device 430 of the corresponding pixel circuit 400 to each of the pixel circuits 400 corresponding to the scan line 101 selected by the scan line driving circuit 100. According to this embodiment, the data signal (data voltage) sets the brightness of a pixel to increase according as a voltage is reduced and sets the brightness of the pixel to be reduced according as the voltage increases. For convenience sake, the data signal supplied to the jth data line 103 is denoted by Xj. The control circuit 300 supplies clock signals (not shown) to the scan line driving circuit 100 and the data line driving circuit 200 to control the two driving circuits and to supply image data for determining the gradation of each pixel to the data line driving circuit 200.

Then, the pixel circuit 400 will be described in detail with reference to FIG. 2. The pixel circuit 400 illustrated in FIG. 2 corresponds to the ith row. As illustrated in FIG. 2, the pixel circuit 400 includes a p channel type driving transistor 410, a first n channel type transistor 412 that functions as a first switching device, a second p channel type transistor 414 that functions as a second switching device, a capacitor 420 having a first electrode, a dielectric layer, and a second electrode, and an OLED device 430 that is a light emitting device. Here, the OLED device 430 may emit light at the brightness corresponding to the current amount or the current level of the driving current that flows from the pixel electrode positioned in the driving transistor toward the opposite electrode facing the pixel electrode due to a light emitting layer inserted into the pixel electrode and being set to have the power supply voltage Vss of the lower voltage side with respect to the power supply voltage of the high voltage side. An EL material in accordance with an emission color is used for the emission layer.

The driving transistor 410 and the second driving transistor 414 are serially connected to each other. In more detail, the second electrode oppositely positioned by inserting the channel of the driving transistor 410, of the driving transistor 410, to which the OLED device 430 is connected, is connected to the first electrode (drain electrode) of the second transistor 414. The second terminal (source electrode) of the second transistor 414 is connected to the power supply line L and the high electric potential power supply voltage Vdd is applied to the second terminal of the second transistor 414. Therefore, the driving current flows to the OLED device 430 in the order of the high electric potential power supply voltage Vdd (power supply line L)→the second transistor 414→the driving transistor 410→the OLED device 430→the low electric potential power supply voltage Vss. Also, the opposite electrode having the low electric potential power supply voltage Vss may be common to a plurality of pixel electrodes.

The gate electrode of the driving transistor 410 is connected to the first electrode of the capacitor 420 and the first terminal (source electrode) of the first transistor 412. The second terminal (drain electrode) of the first transistor 412 is connected to the data line 103. Also, the second electrode of the capacitor 420 is connected to the power supply line L and the high electric potential power supply voltage Vdd is applied to the corresponding second electrode. Also, for convenience sake, a node N is formed between the first electrode of the capacitor 420 and the gate electrode of the driving transistor 410. The source electrode and the drain electrode of a transistor are strictly defined by the level of the relative voltage between conduction type or channel-insertion type two electrodes of the corresponding transistor. For example, when the electric potential of the data signal Xj supplied this time is higher than the electric potential of the node N immediate before the first transistor 412 is turned on, according to the present embodiment, since the first transistor 412 is of an channel type, the drain electrode D and the source electrode S of the first transistor 412 are defined as illustrated in FIG. 2. To the contrary, when the electric potential of the data signal Xj is lower than the electric potential of the node N immediate before the first transistor 412 is turned on, the source electrode S and the drain electrode D are reversed. In the pixel circuit in FIG. 2, in a case of forming a black displaying time when the driving transistor 410 is turned off at the vertical scan time or at the end of the frame, basically, the node N of the first transistor 412 becomes the drain electrode and the data line 103 of the first transistor 412 becomes the source electrode.

Hereinafter, it is assumed that the drain electrode and the source electrode of the first transistor 412 are positioned as illustrated in FIG. 2. The drain electrode of the first transistor 412 is connected to the jth data line 103 and the gate electrode of the first transistor 412 is connected to the ith scan line 101. That is, the scan signal SELi is supplied to the gate electrode of the first transistor 412 through the scan line 101. When the scan signal SELi is at a high level (H level), the first transistor 412 is turned on and the data signal Xj is input to the capacitor 420. When the scan signal SELi is at a low level (L level), the first transistor 412 is turned off and the node N is electrically separated from the data line 103. In this state, the accumulated charge of the capacitor 420 is maintained.

The first transistor 412 is of an n channel type and the second transistor 414 is of a p channel type. The common scan signal SELi is supplied to the gate electrodes of the first and second transistors 412 and 414. However, the scan signal SELi may be set so that, when one of the first transistor 412 and the second transistor 414 is turned on, the other of the first transistor 412 and the second transistor 414 is turned off. Therefore, when the data signal Xj is written in the capacitor 420, it is possible to intercept the driving current supplied to the OLED device 430.

Figure 3:
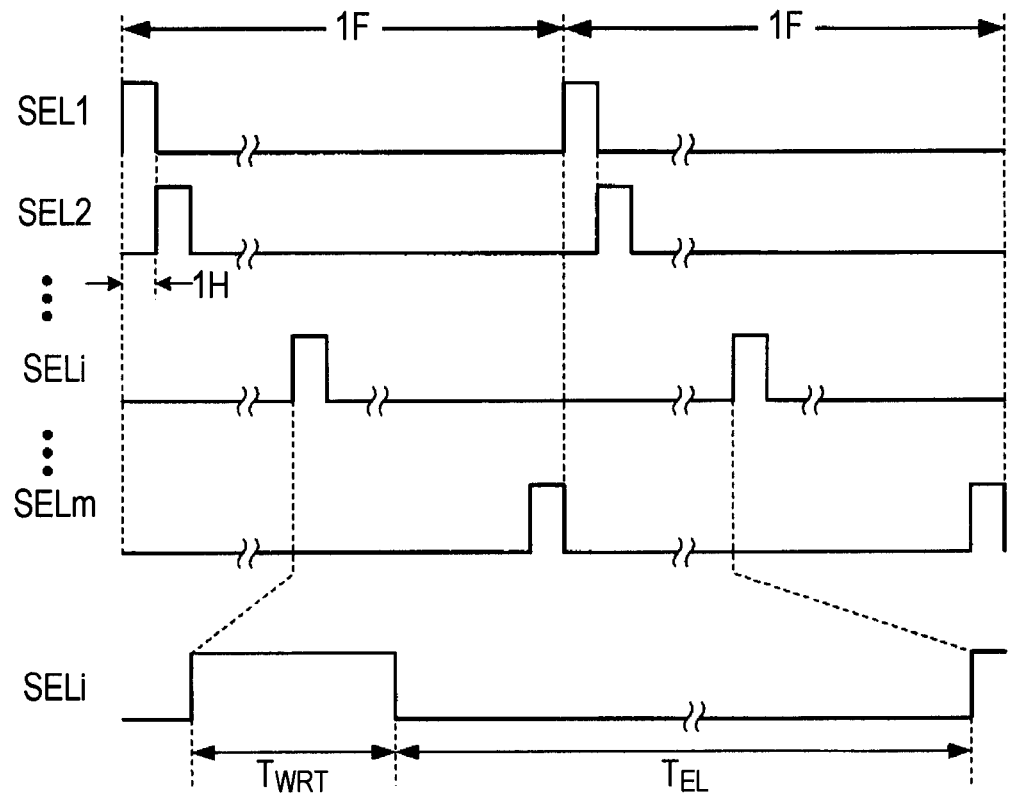
FIG. 3 is a timing chart illustrating the operation of the pixel circuit.

Next, the operation of a light emitting device 1 will be described. FIG. 3 is a timing chart describing the operation of the light emitting device 1.

First, as illustrated in FIG. 3, the scan line driving circuit 100 sequentially selects first, second, third, ..., and mth scan lines 101 every horizontal scan time (1H) from the start of one vertical scan time (1F) so that only the scan signal of the selected scan line 101 is at the H level and the scan signals of the other scan lines are at the L level.

Figure 4:
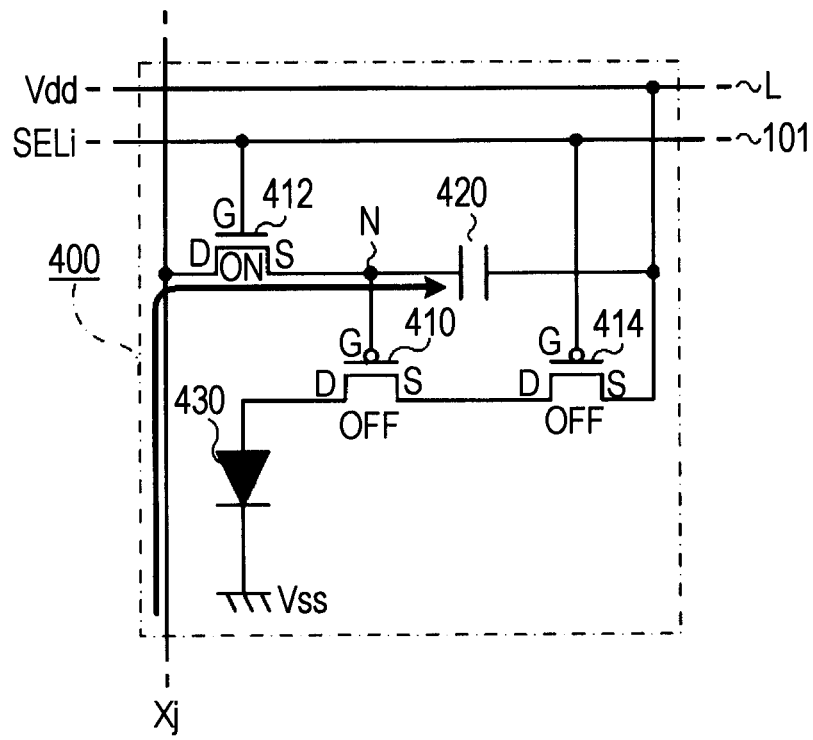
FIG. 4 describes the operation of the pixel circuit.
Figure 5:
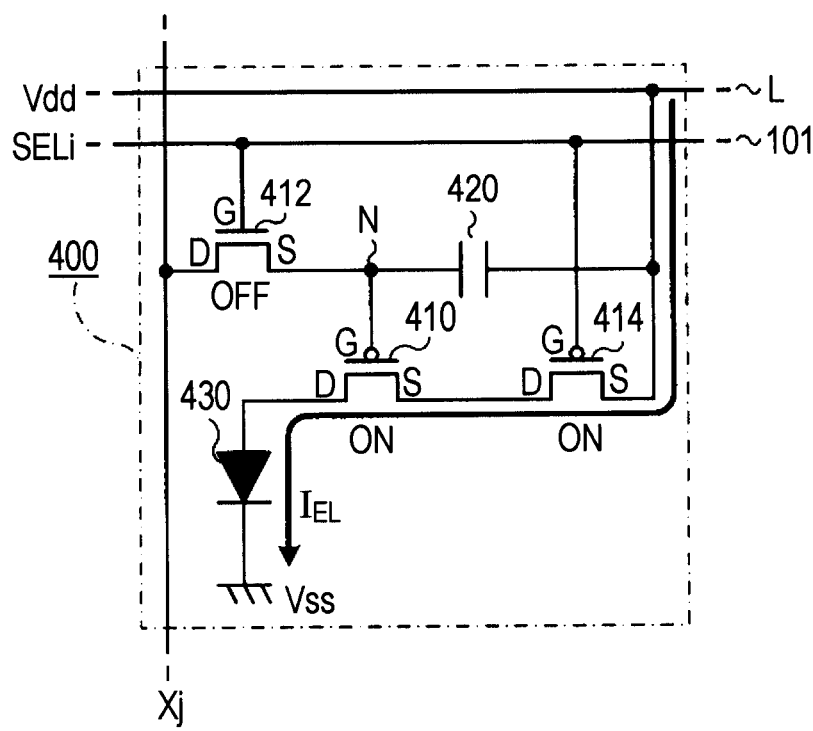
FIG. 5 describes the operation of the pixel circuit.

Here, the operation that is performed when the ith scan line 101 is selected so that the scan signal SELi is at the H level will be described with reference to FIGS. 3, 4, and 5.

As illustrated in FIG. 3, the operation of the pixel circuit 400 in the ith row and jth column may be divided into an operation at a writing time $T_{WRT}$ and an operation at an emission time $T_{EL}$. Hereinafter, the operations in the above-described times will be described in the order.

At the writing time $T_{WRT}$, the data signal Xj is written in the pixel circuit 400. In the corresponding time, the scan line driving circuit 100 makes the scan signal SELi be at the H level. Therefore, in the pixel circuit 400, as illustrated in FIG. 4, the first transistor 412 is turned on and the second transistor 414 is turned off by the scan signal SELi at the H level. Also, at the writing time $T_{WRT}$ the data line driving circuit 200 supplies the data signal Xj of the data voltage in accordance with the gradation of the pixel in the ith row and jth column to the pixel circuit 400 through the data line 103. When the data voltage of the data signal Xj is determined as Vdata, the voltage of the node N becomes Vdata.

In a common circuit structure, the voltage of the power supply line L may be reduced when the driving current starts to flow by wiring line resistance even at the writing time $T_{WRT}$. However, when current flows from the power supply line L to the pixel circuit 400 at the writing time $T_{WRT}$ the power supply voltage Vdd is reduced. According to the present embodiment, since the second transistor 414 is certainly turned off at the writing time $T_{WRT}$ so that the driving current does not flow, it is possible to prevent the power supply voltage Vdd from being reduced.

Next, at the emission time $T_{EL}$ (driving time), the driving current having the current level corresponding to the data signal Xj is supplied to the OLED device 430 so that light is emitted. In the corresponding time, the scan line driving circuit 100 makes the scan signal SELi be at the L level. Therefore, in the pixel circuit 400, as illustrated in FIG. 5, the first transistor 412 is turned off and the second transistor 414 is turned on by the scan signal SELi at the L level. Since the off resistance of the first transistor 412 and the gate input resistance of the driving transistor 410 are very high, the voltage of the node N is maintained as Vdata. At this time, the driving current $I_{EL}$ having the current level in accordance with the data voltage Vdata flows to the OLED device 430 through the second transistor 414. Therefore, the OLED device 430 emits light with the brightness in accordance with the driving current $I_{EL}$.

When the on resistance of the first transistor 414 is ignored, the driving current $I_{EL}$ that flows to the OLED device 430 is obtained by the following Equation (1).

$$I_{EL} = \tfrac{1}{2}\beta(Vgs-Vth)^2$$

$$I_{EL} = \tfrac{1}{2}\beta\{(Vdd-V\text{data})-Vth\}^2 \quad (1)$$

Wherein, Vgs and Vth represent a difference between the gate voltage and the source voltage of the driving transistor 410 and the threshold voltage of the driving transistor, respectively. In the real pixel circuit 400, when the driving current $I_{EL}$ flows, the power supply voltage Vdd is reduced. When the reduction in voltage is denoted by $\Delta V$, the power supply voltage becomes (Vdd−$\Delta V$). Here, since the node N floats, when the power supply voltage is reduced by $\Delta V$, the voltage of the node N is also reduced by $\Delta V$ by the capacity coupling that is performed through the capacitor 420. Therefore, in the Equation (1), Vdd becomes (Vdd−$\Delta V$), Vdata becomes (Vdata−$\Delta V$), and $\Delta V$ is canceled. Therefore, although the power supply voltage Vdd is reduced at the emission time $T_{EL}$, it is possible to prevent the emission brightness of the OLED device 430 from being affected.

That is, when the gate voltage of the driving transistor 410 is set, the electric potential (Vdd) of the side connected to the power supply line L of the capacitor 420 is always made a predetermined electric potential. Here, when the driving current flows, the power supply voltage Vdd change. The change is reflected to the gate voltage of the driving transistor 410 by the capacity coupling that is performed by the capacitor 420. Also, the change in the power supply voltage Vdd is compensated for so that the driving current having the desired current level can be supplied to the OLED device 430. When current flows to the pixel circuit 400 so that the power supply voltage Vdd is reduced at the writing time $T_{WRT}$, the electric potential of the side connected to the power supply voltage Vdd of the capacitor 420 during the setting of the gate voltage of the driving transistor 410 is reduced. Reduction in the electric potential is particularly irregular when the plurality of power supply lines that intersect the plurality of scan lines 101 are arranged. That is, when the plurality of power supply lines that intersect the plurality of scan lines 101 are arranged, the electric potential of the side connected to the power supply voltage Vdd of the capacitor 420 of the pixel circuit in which the data voltage is written is affected by the current level of the driving current of the pixel circuit excluding the pixel circuit. This is because the current level of the driving current temporally changes in accordance with display contents.

According to the present embodiment, since the second transistor 414 is turned off at the writing time $T_{WRT}$ as described above, current is prevented from flowing to the pixel circuit 400 and the plurality of power supply lines L are arranged to intersect the plurality of data lines 103 or are arranged along the plurality of scan lines 101. Therefore, the power supply voltage Vdd is prevented from being reduced at the writing time $T_{WRT}$ and the change in the power supply voltage Vdd is directly reflected to the gate voltage of the driving transistor 410 at the emission time $T_{EL}$. As a result, the change in the power supply voltage Vdd is compensated for so that the driving current having the desired current level can be supplied to the OLED device 430.

As described above, when the plurality of power supply lines L are arranged to intersect the plurality of data lines 103 along the plurality of scan lines 101, the plurality of pixel circuits 400 arranged in one row are connected to one power supply line L. Here, when the ith scan line is selected, data voltages are input from the data lines 103 to all of the pixel circuits 400 arranged in the ith row. At this time, since the first transistor 412 is turned on and the second transistor 414 is turned off, the path through which the driving current $I_{EL}$ is supplied to the OLED device 430 is intercepted at the writing time $T_{WRT}$ in each of the pixel circuits 400 in the ith row. Therefore, the power supply voltage Vdd of the power supply line L is prevented from being reduced at the writing time $T_{WRT}$ so that the difference Vgs between the gate voltage and the source voltage can be correctly set with respect to each of the pixel circuits 400.

The power supply line provided around the pixel area A may be referred to as a main power supply line and the plurality of power supply lines provided in the pixel area A in the row direction may be referred to as auxiliary power supply lines. In this case, the width of the auxiliary power supply lines is made smaller than the width of the main power supply line so that the aperture ratio of the OLED device 430 is improved. However, the reduction in the power supply voltage Vdd is mostly generated by the auxiliary power supply lines. At the time when the ith scan line 101 is selected, the pixel circuits 400 connected to the other scan lines 101 are at the emission time so that the driving current $I_{EL}$ flows to the pixel circuits 400. However, since the resistance of the power supply line is mostly generated in the auxiliary power supply lines, the auxiliary power supply lines are arranged in the row direction so that it is possible to prevent the driving current from changing due to the reduction in the power supply voltage Vdd.

Also, the OLED device 430 is formed of a light emitting organic material such as monomer, polymer, and dendrimer. The OLED device 430 is an example of the current driving device. However, the driving circuit according to the above embodiment may be used for a voltage driving device. For example, an inorganic EL device, a field emission (FE) device, a surface conduction electron emitter (SE) device, a ballistic electron surface emitting (BS) device, an electrophoresis device, or an electrochromic device can be used as the driven device of the driving circuit according to the embodiment. The driving circuit according to the embodiment can be used as the driving circuit of the electro-optical device such as a recording head used for an optical recording printer or electronic photocopier. Also, for example, the driving circuit according to the present embodiment can be applied to a sensing device in which an object to be examined is detected by measuring a current level or a voltage level such as a biochip.

Figure 6:
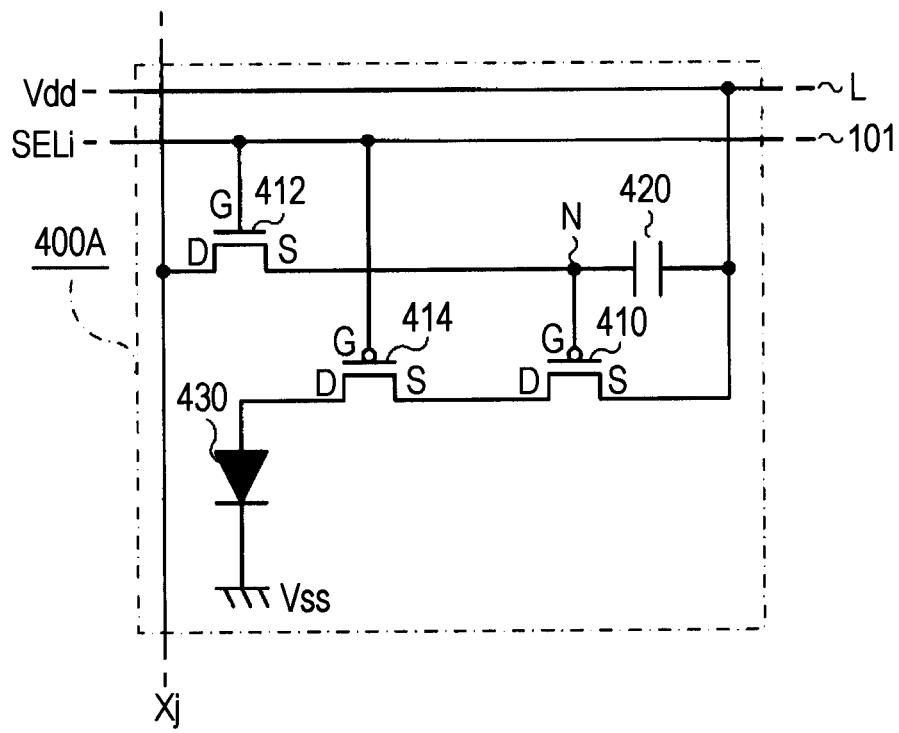
FIG. 6 is a circuit diagram illustrating another example of the pixel circuit.

Next, another example of the pixel circuit will be described. FIG. 6 is a circuit diagram illustrating another example of the pixel circuit. In the pixel circuit 400A, the positions of the driving transistor 410 and the second transistor 414 of the pixel circuit 400 illustrated in FIG. 2 are reversed. That is, the second transistor 414 is connected between the driving transistor 410 and the OLED device 430 and the operation of the pixel circuit 400A is almost the same as the writing operation and the emission operation according to the above-described embodiment. That is, the second transistor 410 is preferably formed on the path through which the driving current $I_{EL}$ is supplied to the OLED device 430.

Figure 7:
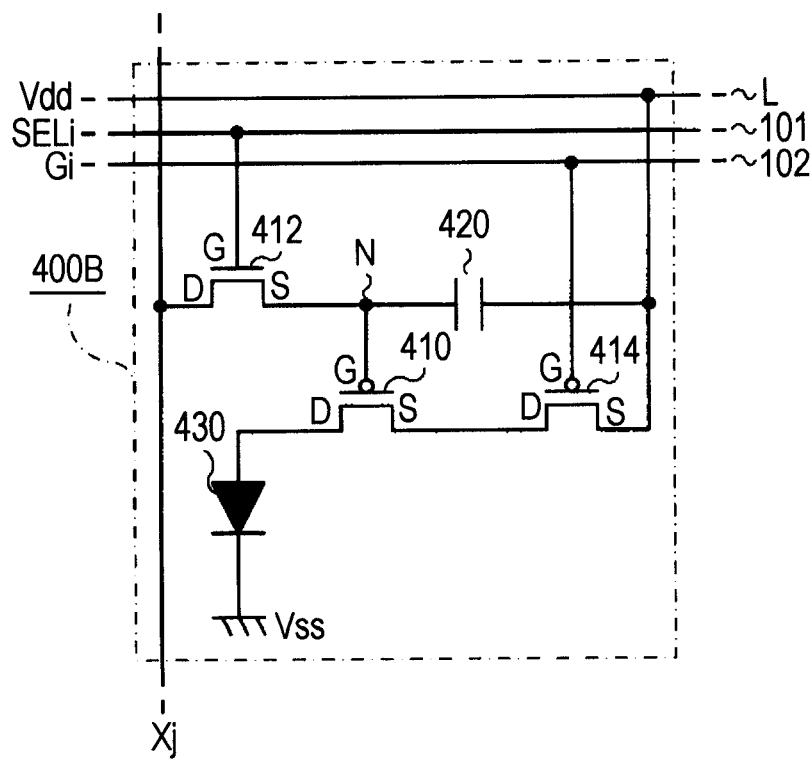
FIG. 7 is a circuit diagram illustrating another example of the pixel circuit.

FIG. 7 is a circuit diagram illustrating another example of the pixel circuit. In the above-described embodiment, the turning on and off of the second transistor 414 is controlled by the scan signal SELi for controlling the first transistor 412. In the pixel circuit 400B according to the present example, the second transistor 414 is controlled by a control signal Gi. In this case, m control lines 102 are formed to run parallel to the m scan lines 101 and the scan line driving circuit 100 generates control signals G1 to Gm other than the scan signals SEL1 to SELm to supply the control signals G1 to Gm to the control lines 102, respectively. According to the above structure, the turning on and off of each of the first transistor 412 and the second transistor 414 is independently controlled.

Figure 8:
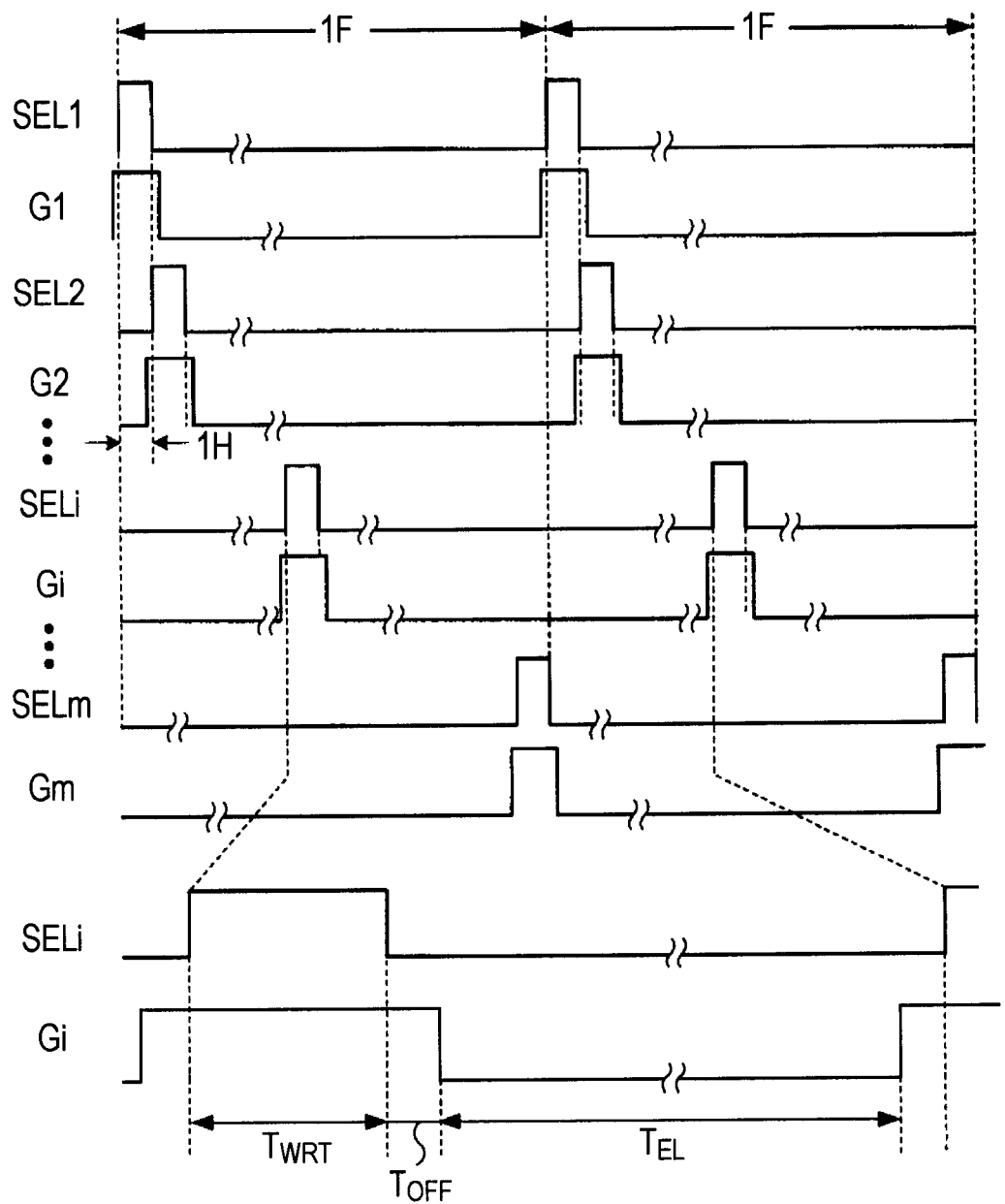
FIG. 8 is a timing chart illustrating the operation of the pixel circuit.

FIG. 8 is a timing chart of the pixel circuit 400B illustrated in FIG. 7. The operation of the pixel circuit 400 in the ith row and jth column is divided into an operation at the writing time $T_{WRT}$, an operation in an idle time $T_{OFF}$, and an operation at the emission time $T_{EL}$. In this example, the time at which the scan signal SELi is at the H level is as illustrated in the above-described embodiment, which is the writing time $T_{WRT}$. On the other hand, the pulse width of the control signal Gi at the H level is larger than the pulse width of the scan signal SELi at the H level. That is, since the control signal Gi is deactivated for the time longer than the time for which the scan signal SELi is activated.

Here, at the idle time $T_{OFF}$ when the scan signal SELi is at the L level and the control signal Gi is at the H level, the first transistor 412 and the second transistor 414 are turned off. Therefore, in the idle time $T_{OFF}$, the data signal Xj is not input to the pixel circuit 400 and the OLED device 430 does not emit light. As described above, the idle time $T_{OFF}$ is formed between the writing time $T_{WRT}$ and the emission time $T_{EL}$ so that a margin is generated. Therefore, it is possible to prevent the writing time $T_{WRT}$ and the emission time $T_{EL}$ from overlapping each other. That is, it is possible to prevent the driving current from flowing between the power supply line L and the opposite electrode having the low electric potential power supply voltage Vss at the writing time $T_{WRT}$.

Figure 9:
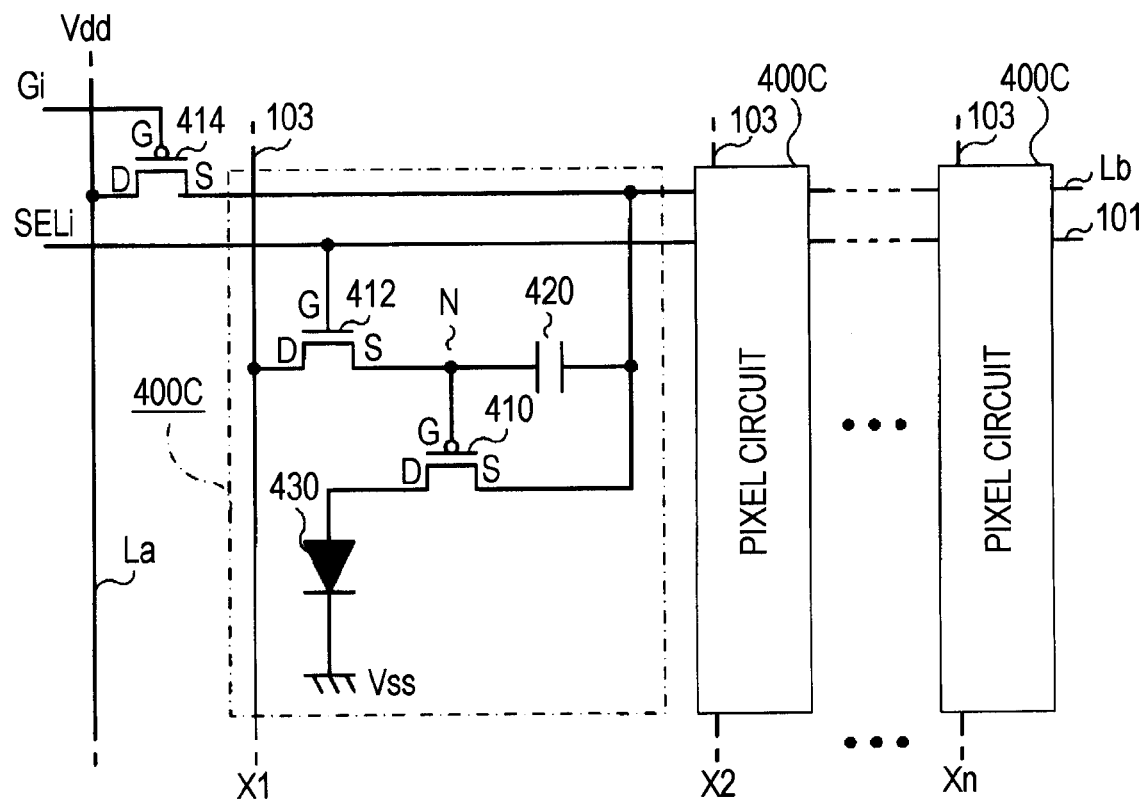
FIG. 9 is a circuit diagram illustrating another example of the pixel circuit.

Also, the scan signal SELi is supplied to the n pixel circuits 400 arranged in the ith row through the ith scan line 101. Since parasitic capacity is generated in the scan line 101, a trapezoidal low pass filter is equivalently formed in the scan line 101. Therefore, when the scan signal SELi is supplied from one end of the ith scan line 101, the scan signal SELi supplied to the pixel circuit 400B connected to the other end of the ith scan line 101 is delayed compared with the scan signal SELi supplied to the pixel circuit 400B connected to one end of the ith scan line 101. That is, when the idle time $T_{OFF}$ is not formed, the writing time $T_{WRT}$ continues in the pixel circuit 400B connected to the other end of the ith scan line 101 at the timing when the writing time $T_{WRT}$ is terminated and the emission time $T_{EL}$ starts in the pixel circuit 400 connected to one end of the ith scan line 101. Therefore, it is difficult to correctly set the difference Vgs between the gate voltage and the source voltage due to the change in the power supply voltage Vdd. However, in this example, since the idle time $T_{OFF}$ is formed, it is possible to correctly record the data voltage Vdata. Here, the idle time $T_{OFF}$ is preferably set to be longer than the delay time of the scan signal SELi. FIG. 9 is a circuit diagram illustrating another example of the pixel circuit. In this example, the pixel circuit 400C in the ith row is illustrated. The structure of the pixel circuit 400C is the same as the structure of the pixel circuit 400 according to the above-described embodiment excluding that the second transistor 414 is common to the plurality of pixel circuits 400C. The second transistor 414 according to the example is electrically connected between a main power supply line La provided in the column direction and an auxiliary power supply line Lb provided in the row direction. The turning on and off of the second transistor 414 is controlled by the control signal Gi. In this case, the control signal Gi is at the H level at the writing time $T_{WRT}$ and the control signal Gi is at the L level at the emission time $T_{EL}$. Therefore, meanwhile the supply of the power supply voltage Vdd to the pixel circuits 400C is intercepted at the writing time $T_{WRT}$, the power supply voltage Vdd is supplied to the pixel circuits 400C at the emission time $T_{EL}$. In the above-described structure, since the plurality of pixel circuits 400C share the second transistor 414, it is possible to simplify the structure of the pixel circuit or the light emitting device 1.

Figure 10:
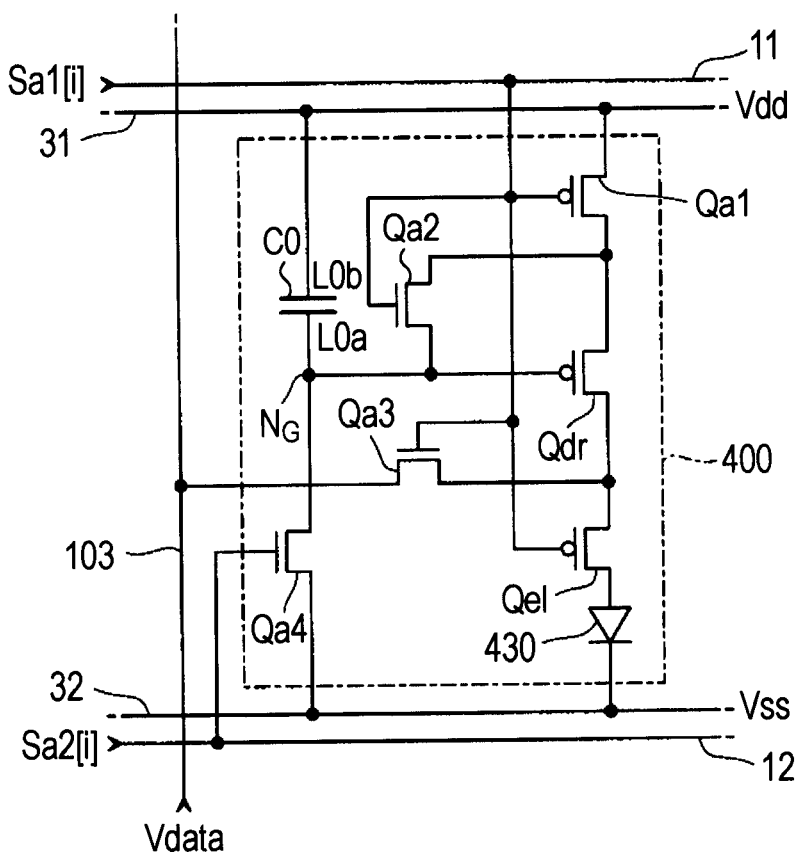
FIG. 10 is a circuit diagram illustrating another example of the pixel circuit.

Next, the structure of the pixel circuit 400 will be described with reference to FIG. 10. In FIG. 10, only the jth (j is an integer that satisfies 1≤j≤n) pixel circuit 400 that belongs to the ith (i is an integer that satisfies 1≤i≤m) row is illustrated. However, the other pixel circuits 400 have the same structure. Also, the conduction type of the transistor that constitutes the pixel circuit 400 is not limited to the example of FIG. 10. Also, the transistor illustrated in FIG. 10 is a thin film transistor (TFT) obtained by using low temperature poly silicon for a semiconductor layer. However, the shape and material of the transistor are not limited.

As illustrated in FIG. 10, the pixel circuit 400 includes an OLED device 420 and a p channel type transistor (hereinafter, a driving transistor) Qdr that are interposed between a power supply line 31 to which the power supply voltage Vdd is supplied and an opposite electrode 32 to which a ground voltage Vss is supplied. The OLED device 430 may emit light at the brightness corresponding to the current amount or the current level of the driving current that flows from the pixel electrode positioned in the driving transistor toward the opposite electrode 32 facing the pixel electrode due to a light emitting layer inserted into the pixel electrode and being set to have the power supply voltage Vss of the lower voltage side with respect to the power supply voltage of the high voltage side. An EL material in accordance with an emission color is used for the emission layer. The driving transistor Qdr is a transistor for controlling the current level of the driving current or the voltage level of the driving voltage that is supplied to the OLED device 430.

As described later, the driving circuit according to the present embodiment is suitable for a driven device that is mainly driven by current such as the OLED device 430. However, instead of the OLED device 430, a voltage driven device that is mainly driven by a voltage such as an inorganic EL device, a field emission (FE) device, a surface conduction electron emitter (SE) device, a ballistic electron surface emitting (BS) device, an electrophoresis device, or an electrochromic device can be used as the driven device. Also, the driving circuit according to the embodiment can be used as the driving circuit of the electro-optical device such as a recording head used for an optical recording printer or electronic photocopier. Also, for example, the driving circuit according to the present embodiment can be applied to a sensing device in which an object to be examined is detected by measuring a current level or a voltage level such as a biochip.

The scan line 10 illustrated as one wiring line for convenience sake in FIG. 1 actually includes a first control line 11 and a second control line 12 as illustrated in FIG. 10. First control signals Sa1[1] to Sa1[m] for determining the time for inputting the data voltage Vdata to the pixel circuit 400 are supplied from the scan line driving circuit 100 to the first control line 11 of each row. On the other hand, second control signals Sa2[1] to Sa2[m] for determining the time for initializing the voltage maintained in the pixel circuit 400 are supplied from the scan line driving circuit 100 to the second control line 12 of each row. Also, the detailed waveforms of the signals and the operations of the pixel circuit 400 in accordance with the waveforms will be described later.

A first transistor Qa1 illustrated in FIG. 10 is a p channel type transistor connected between the driving transistor Qdr and the power supply line 31. The first transistor Qa1 and the driving transistor Qdr are serially connected to each other and the first transistor Qa1 functions as a switching device for controlling electric connection between the driving transistor Qdr and the power supply line 31. On the other hand, the emission control transistor Qe1 illustrated in FIG. 10 is a p channel type transistor connected between the driving transistor Qdr and the OLED device 430 and functions as a switching device for controlling electric connection between the driving transistor Qdr and the OLED device 430. The gate electrodes of the first transistor Qa1 and the emission control transistor Qe1 are connected to the first control line 11. However, when the first control signal Sa1[i] is properly set, it is possible to set both of the first transistor Qa1 and the emission control transistor Qe1 to operate. To be specific, the first transistor Qa1 and the emission control transistor Qe1 are turned off when the first control signal Sa1[i] is at the H level and are turned on when the first control signal Sa1[i] is at the L level.

The second transistor Qa2 illustrated in FIG. 10 is an n channel type transistor connected between the gate of the driving transistor Qdr and the first transistor Qa1. Also, the third transistor Qa3 illustrated in FIG. 10 is an n channel type transistor connected between the driving transistor Qdr and the data line 103 and functions as a switching device for switching conduction and non-conduction of the driving transistor Qdr and the data line 103. The gate electrodes of the second transistor Qa2 and the third transistor Qa3 are connected to the first control line 11. Therefore, the second transistor Qa2 and the third transistor Qa3 are turned on when the first control signal Sa1[i] is at the H level and are turned off when the first control signal Sa1[i] is at the L level. When the second transistor Qa2 is turned on, electricity flows through the gate electrode and the source electrode of the driving transistor Qdr so that the driving transistor Qdr functions as a diode.

Next, the capacitor C0 illustrated in FIG. 10 is a capacitor for maintaining a charge between a first electrode L0a and a second electrode L0b. The first electrode L0a is connected to the gate electrode of the driving transistor Qdr and the second electrode L0b is connected to the power supply line 31. A fourth transistor Qa4 is connected to the connection point $N_G$ between the first electrode L0a of the capacitor C0 and the gate electrode of the driving transistor Qdr. The fourth transistor Qa4 is a n channel type transistor connected between the first electrode L0a and the ground voltage Vss and functions as a switching device for controlling electric connection between the first electrode L0a or the connection point $N_G$ and the ground voltage Vss (typically, for switching conduction and non-conduction of the first electrode L0a and the ground voltage Vss). The gate electrode of the fourth transistor Qa4 is connected to the second control line 12. Therefore, the fourth transistor Qa4 is turned on when the second control signal Sa2[i] is at the H level and is turned off when the second control signal Sa2[i] is at the L level.

Figure 11:
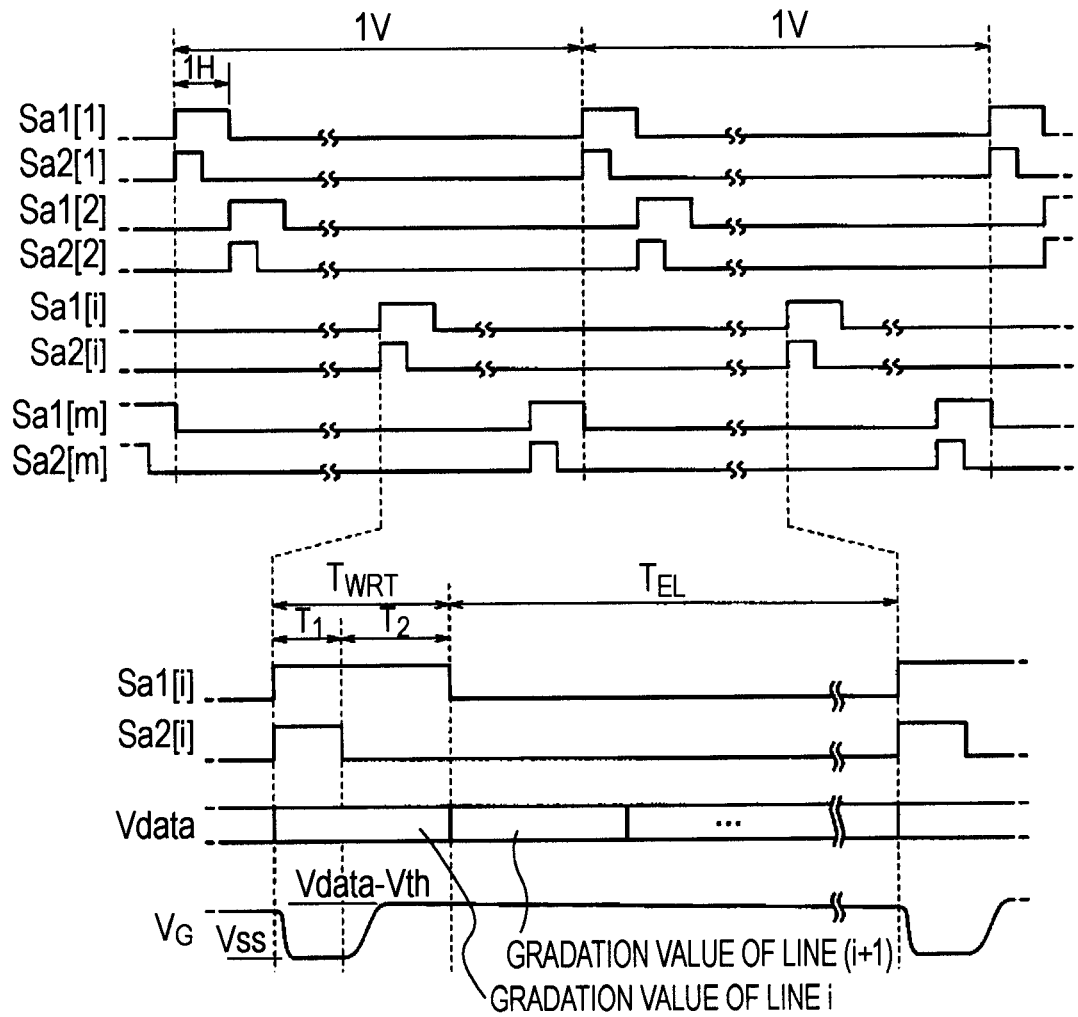
FIG. 11 is a timing chart illustrating the waveforms of signals supplied to the pixel circuit.

Next, the detailed waveforms of the first control signals Sa1[1] to Sa1[m] and the second control signals Sa2[1] to Sa2[m] will be described with reference to FIG. 11. As illustrated in FIG. 11, the first control signals Sa1[1] to Sa1[m] are signals sequentially transited to the H level every horizontal scan time (1H). That is, the first control signal Sa1[i] maintains the H level in the ith horizontal scan time in the vertical scan time (1V) and maintains the L level in the other time. The transition of the first control signal Sa1[i] to the H level means that the pixel circuits 400 in the ith row are selected. As illustrated in FIG. 11, in the horizontal scan period when the first control signal Sa1[i] is at the H level, the data voltage Vdata corresponding to the gradation of the pixel circuits 400 in the ith row is supplied to the data line 103. The data voltage Vdata is input to the pixel circuits 400 through the third transistor Qa3 that is turned on by the first control signal Sa1[i] at the H level. Hereinafter, the time (that is, horizontal scan time) at which the first control signals Sa1[1] to Sa1[m] are at the H level is referred to as the writing time $T_{WRT}$. On the other hand, at least a part of the time other than the writing time $T_{WRT}$ (that is, the time at which the first control signals Sa1[1] to Sa1[m] are at the L level) is referred to as the time (hereinafter, the driving time $T_{EL}$) at which the driving current having the current level in accordance with the data voltage Vdata is supplied to the OLED device 430.

The writing time $T_{WRT}$ at which the first control signal Sa1[i] is at the H level is divided into a first time $T_1$ and a second time $T_2$. The first time $T_1$ starts from the point of time of the writing time $T_{WRT}$ and lasts until a predetermined time passes. The second time $T_2$ is the remaining time of the corresponding writing time $T_{WRT}$. The second control signal Sa2[i] maintains the H level at the first time $T_1$ and maintains the L level at the other times (that is, the second time $T_2$ and the driving time $T_{EL}$). When the second control signal Sa2[i] is at the H level, the connection point $N_G$ and the ground voltage Vss of FIG. 10 are electrically connected to each other through the fourth transistor Qa4 that is turned on.

Figure 12:
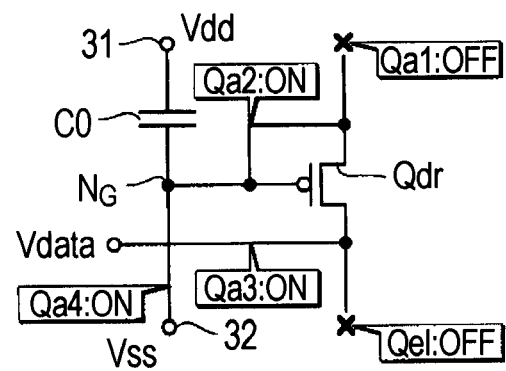
FIG. 12 is a circuit diagram illustrating the structure of the pixel circuit at a first time.
Figures 13A, 13B:
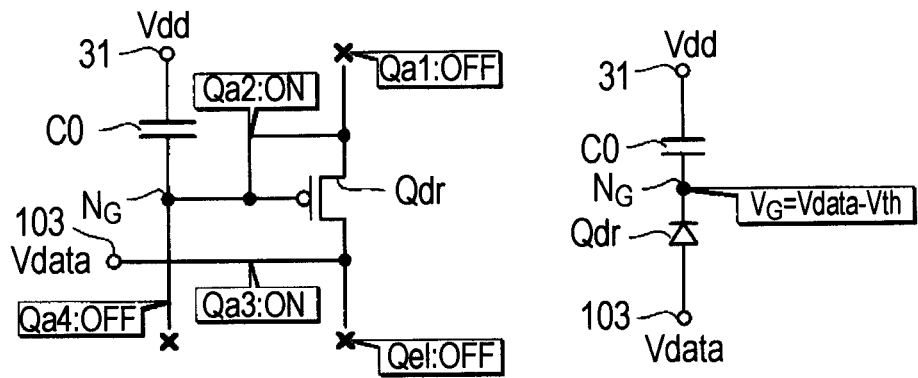
FIG. 13 is a circuit diagram illustrating the structure of the pixel circuit at a second time.
Figure 14:
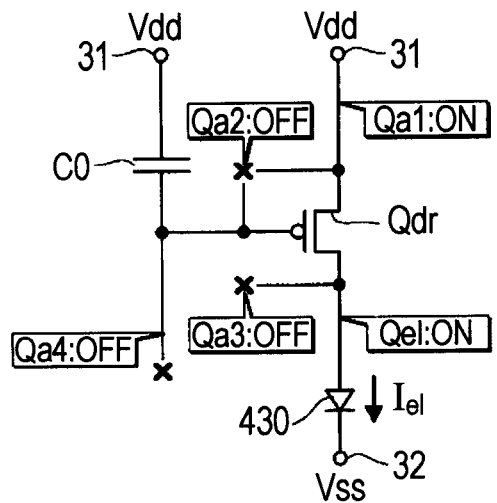
FIG. 14 is a circuit diagram illustrating the structure of the pixel circuit at a driving time.

Next, the detailed operation of the pixel circuit 400 will be described with reference to FIGS. 12 to 14. Hereinafter, the operation of the pixel circuit 400 in the first row and the jth column will be divided into an operation at the first time $T_1$, an operation at the second time T$_2$, and an operation at the driving time T$_{EL}$ to be described.

(a) First Time T$_1$ (Writing Time T$_{WRT}$)

At the first time T$_1$, as illustrated in FIG. 11, the first control signal Sa1[i] and the second control signal Sa2[i] maintain the H level. Therefore, the second transistor Qa2, the third transistor Qa3, and the fourth transistor Qa4 are turned on and the first transistor Qa1 and the emission control transistor Qe1 are turned off. FIG. 12 is a circuit diagram equivalently illustrating the electric structure of the pixel circuit 400. As illustrated in FIG. 12, since the connection point N$_G$ (that is, the gate electrode of the driving transistor Qdr) is electrically connected to the ground voltage Vss through the fourth transistor Qa4 that is turned on, as illustrated in FIG. 11, the voltage V$_G$ of the connection point N$_G$ is reduced to the ground voltage Vss at the first time T1. In other words, the first time T$_1$ illustrated in FIG. 11 is set to be long enough for the voltage V$_G$ of the connection point N$_G$ to reach the ground voltage Vss. As described above, since the second transistor Qa2, the third transistor Qa3, and the fourth transistor Qa4 are turned on, in at least a part of the first time T$_1$, current flows between the data line 103 and the ground electric potential 32 through the fourth transistor Qa4, the second transistor Qa2, and the driving transistor Qdr. The current operates as a kind of pre-charge current to rapidly set the gate voltage of the driving transistor Qdr by the data voltage Vdata. Also, it is not necessary to make the starting point of time at which the fourth transistor Qa4 is turned on and the starting point of time at which the second transistor Qa2 and the third transistor Qa3 are turned on completely the same. The starting point of time at which at least the fourth transistor Qa4 is turned on and the time at which the second transistor Qa2, the third transistor Qa3, and the fourth transistor Qa4 are turned on are formed so that the pre-charge effect is obtained by the current as described above. When the second transistor Qa2 and the third transistor Qa3 are turned on after the time at which the fourth transistor Qa4 is turned on is terminated, it is possible to correctly set the electric potential of the connection point N$_G$ immediately before the time at which the second transistor Qa2 and the third transistor Qa3 are turned on.

(b) Second Time (Writing Time T$_{WRT}$)

At the second time T$_2$, as illustrated in FIG. 11, the first control signal Sa1[i] maintains the H level and the second control signal Sa2[i] maintain the L level. Therefore, the second transistor Qa2 and the third transistor Qa3 are continuously turned on and the first transistor Qa1, the fourth transistor Qa4, and the emission control transistor Qe1 are turned off. FIG. 13A is a circuit diagram equivalently illustrating the electric structure of the pixel circuit 400. As illustrated in FIG. 13A, the fourth transistor Qa4 is turned off so that the connection point N$_G$ is electrically separated from the ground voltage Vss. Also, the second transistor Qa2 is turned on so that electricity flows through the driving transistor Qdr and that the driving transistor Qdr functions as a diode. Then, the connection point N$_G$ and the first electrode L0a of the capacitor C0 are connected to the data line 103 through the third transistor Qa3. Therefore, the pixel circuit 400 at this time is equivalent to the circuit in which the capacitor C0 and the driving transistor Qdr that functions as a diode that are serially connected to each other are interposed between the power supply line 31 and the data line 103 as illustrated in FIG. 13B. Therefore, the voltage V$_G$ of the connection point N$_G$ between the capacitor C0 and the driving transistor Qdr gradually increases until the voltage V$_G$ reaches a level (V$_G$=Vdata−Vth) obtained by subtracting the threshold voltage Vth of the driving transistor Qdr from the voltage Vdata of the data line 103 as illustrated in FIG. 11. The second time T$_2$ is set to be long enough for the voltage V$_G$ of the connection point N$_G$ to reach the level (Vdata−Vth) from the point of time at which the second transistor Qa2 and the third transistor Qa3 are turned on.

As described above, at the writing time T$_{WRT}$ (the first time T$_1$ and the second time T$_2$), the first control signal Sa1[i] maintains the H level so that the first transistor Qa1 and the emission control transistor Qe1 are turned off. Therefore, the power supply line 31 and the driving transistor Qdr are electrically insulated from each other and the path of the current that is transmitted from the power supply line 31 to the opposite electrode 32 through the OLED device 430 is intercepted. In the pixel circuit 400 in such a state, since current does not flow between the power supply line 31 and the opposite electrode 32, it is possible to prevent a voltage from being reduced in the power supply line 31. Therefore, at the writing time T$_{WRT}$, the difference Vgs between the gate voltage and the source voltage is maintained with a high precision degree in the capacitor C0 interposed between the power supply line 31 and the connection point N$_G$.

(c) Driving Time T$_{EL}$

At the driving time T$_{EL}$, the first control signal Sa1[i] and the second control signal Sa2[i] are at the L level. Therefore, meanwhile the second transistor Qa2, the third transistor Qa3, and the fourth transistor Qa4 are turned off, the first transistor Qa1 and the emission control transistor Qe1 are turned on. FIG. 14 illustrates a circuit illustrating an equivalent structure of the pixel circuit 400 at this time. As shown in the drawing, the first transistor Qa1 and the light emitting control transistor Qe1 are transited to ON state so that a path from the power supply line 31 to the opposite electrode 32 via the driving transistor Qdr and the OLED device 430 is formed. Since the voltage V$_G$ of the gate electrode of the driving transistor Qdr at this time, as shown in FIG. 11, is maintained as the voltage (in other words, a voltage due to the data voltage Vdata) maintained by the capacitor C0 at the writing time T$_{WRT}$, the driving current Ie1 flowing from the power supply line 31 to the OLED device 430 has a current level according to the data voltage Vdata. Therefore, the OLED device 430 emits light at the brightness corresponding to the data voltage Vdata.

Here, the driving current Ie1 flowing from the source electrode of the driving transistor Qdr to the drain electrode is expressed by the following equation (2).

$$I_{e1} = (1/2)\beta(Vgs-Vth)^2 \quad (2)$$

Moreover, in the equation (2), Vgs is a voltage between the gate and the source of the driving transistor Qdr, β is a gain coefficient of the driving transistor Qdr. At the driving time T$_{EL}$, since the voltage V$_G$ (=Vdata−Vth) maintained by the capacitor C0 at the writing time T$_{WRT}$ immediately before the driving time T$_{EL}$ is applied to the gate electrode, and at the same time, the power supply voltage Vdd is supplied to the source electrode of the driving transistor via the first transistor Qa1 being turned ON, the voltage Vgs becomes Vdd−(Vdata−Vth). When this is substituted into the equation (2) and the equation is reformed, the driving current Ie1 is expressed by the following equation (3).

$$I_{e1} = (1/2)\beta(Vdd-V\text{data})^2 \quad (3)$$

In other words, the driving current Ie1 is not dependent on the threshold voltage Vth of the driving transistor Qdr. Therefore, according to the present embodiment, characteristic unbalance such as the threshold voltage Vth of the driving transistor Qdr in each pixel circuit 400 is compensated so that the OLED device 430 can emit light at a desired brightness with a high precision.

However, when the driving current Ie1 flows through the actual pixel circuit 400, the power supply voltage Vdd is dropped. If the dropped value of the voltage at this time is set to ΔV, the power supply voltage after the voltage drop is Vdd−ΔV. Since the connection point $N_G$ at the driving time $T_{EL}$ is the floating state, when the power supply voltage Vdd is dropped by ΔV, the voltage at the connection point $N_G$ is basically dropped by ΔV. Therefore, since Vdd becomes Vdd−ΔV in the equation (3) and Vdata in the same equation becomes Vdata−ΔV, the influence by the voltage drop of the power supply voltage Vdd with respect to the driving current Ie1 is therefore canceled. In other words, the voltage drop of the power supply voltage Vdd at the driving time $T_{EL}$ does not give influence the brightness of the OLED device 430.

Moreover, in the present embodiment, since the respective power supply lines 31 are formed along the arrangement direction of the respective pixels selected by the scan line driving circuit 100 at once (in other words, the direction of the arrangement of the pixels for simultaneously executing the insertion), the voltage drop of the power supply voltage Vdd at the writing time $T_{WRT}$ can be securely prevented. This advantage will be described in detail as follows.

Presently, as a comparative example of the present embodiment, assumed is a structure in which power supply lines 31 are continuously present in the direction following the data line 103. In this structure, when the first control signal Sa1[i] is transited to the high level and the scan line driving circuit 100 selects the ith raw, the data voltage Vdata is inserted into the pixel circuits 400 in the respective columns of this raw. Although the path of the driving current Ie1 is intercepted by turning the first transistor Qa1 or the light emitting control transistor Qe1 of the ith pixel circuit 400 OFF at the writing time $T_{WRT}$, since the driving current Ie1 is supplied to the OLED device 430 of the pixel circuit 400 belonging to other rows (in other words, the pixel circuit 400 at the driving time $T_{EL}$), the power supply voltage Vdd of the power supply lines 31 in the respective rows is dropped. In other words, since the power supply voltage Vdd to be supplied to the second electrode L0b of the capacitor C0 when the data voltage of the respective pixel circuits 400 belonging to the ith raw is inserted at the writing time $T_{WRT}$, it is difficult to maintain a desired amount of electric charges corresponding to the data voltage Vdata in the capacitor C0.

Meanwhile, in a structure in which the power supply line 31 is formed in the raw direction like the present embodiment, when the respective ith pixel circuits 400 commonly connected to a single power supply line 31 is selected by the scan line driving circuit 100, the insertion of the data voltage Vdata into the number n of the pixel circuits 400 is performed at once. Therefore, due to the supply of the driving current Ie1 to the OLED device 430, the power supply voltage Vdd of the power supply line 31 is prevented from dropping so that the data voltage Vdata can be precisely inserted into the respective pixel circuits 400.

However, wires for supplying the power supply voltage Vdd from the power supply circuit 500 to the respective pixel circuits 400 includes a main power supply line disposed surrounding a pixel area A and an auxiliary power supply line extending in the pixel circuit 400 in the raw direction. The auxiliary power supply line, in view of sufficiently securing an area (aperture ratio) where the respective OLED devices 430 emit light, is formed by a narrow line width by comparison to the main power supply line. Therefore, a majority of the voltage drop of the power supply voltage is generated in the auxiliary power supply line. In the time when the respective pixel circuits 400 in the ith raw are selected, since the respective pixel circuits 400 belonging to other rows are at the driving time $T_{EL}$, the driving current Ie1 flows into the respective OLED devices 430. However, since the majority of resistance of the power supply line 31 is in the auxiliary power supply line, when the auxiliary power supply line is formed in the raw direction like the present embodiment, it can be obtained a secure effect that the voltage drop of the power supply voltage Vdd is improved.

Next, other embodiments related to the present invention will be described. Moreover, common references are assigned to like components in the above embodiment among the embodiments and their description will be omitted.

Figure 15:
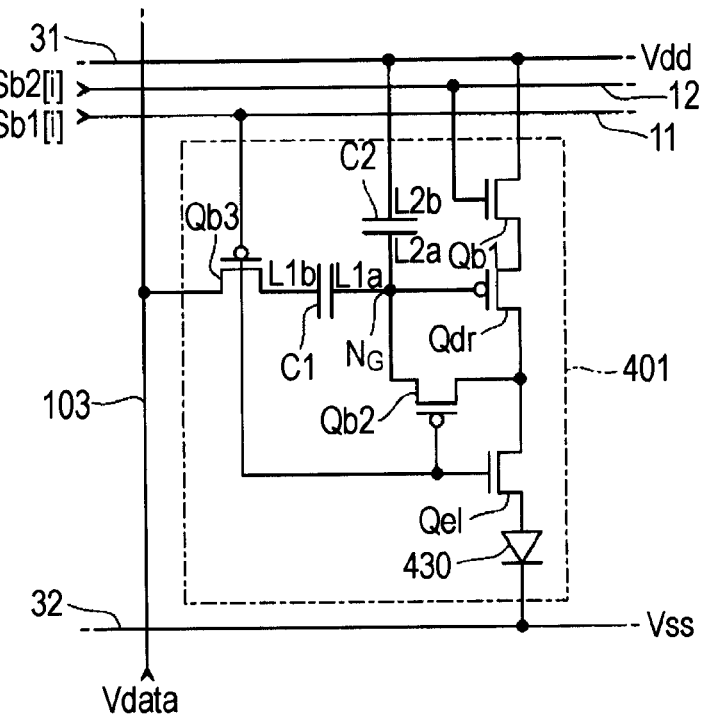
FIG. 15 is a circuit diagram illustrating another example of the pixel circuit.

FIG. 15 illustrates a circuit illustrating the structure of other pixel circuit related to the present embodiment. As shown in the drawing, the pixel circuit 401 of the present embodiment, like the first embodiment, includes the OLED devices disposed between the power supply line 31 and the opposite electrode 32 and the p-channel type driving transistor Qdr. Between the driving transistor Qdr and the OLED device 430, the n-channel type light emitting control transistor Qe1 is disposed. The gate electrode of the light emitting control transistor Qe1 is connected to a first control line 11 through which the first control signal Sb1[i] is supplied. Meanwhile, the source electrode of the driving transistor Qdr is connected to the source electrode of the first transistor Qb1. The first transistor Qb1 is an n-channel type transistor having a drain electrode connected to the power supply line 31, and serves as a switching device for switching the electric conduction and non-conduction between the source electrode of the driving transistor Qdr and the power supply line 31. The gate electrode of the first transistor Qb1 is connected to the second control line 12 through which the second control signal Sb2[i] is supplied.

Meanwhile, the second transistor in FIG. 15 is a p-channel type transistor connected between the gate electrode of the driving transistor Qdr and any one of the drain electrode and the source electrode of the driving transistor Qdr. The gate electrode of the second transistor Qb2 is connected to a first control line 11. Moreover, to the gate electrode of the driving transistor Qdr, the first electrode L1a of the first capacitor C1 and the first electrode L2a of the second capacitor C2 are connected. The second electrode L2b of the second capacitor C2 is connected to the power supply line 31. The second electrode L1b of the first capacitor C1 is connected to the drain electrode of the third transistor Qb3. The third transistor Qb3 is a switching device for controlling the electrical connection between the data line 103 and the second electrode L1b of the first capacitor C1 (typically, switching conduction and non-conduction therebetween), the source electrode thereof is connected to the data line 103, and the gate electrode thereof is connected to the first control line 11. Moreover, in the present embodiment, the voltage, supplied to the electrodes of the respective transistors, varies suitable for the operating state. Generally, in the p-channel type transistor, since a high voltage electrode is defined as a source electrode, in the respective transistors of the present embodiment, the source electrodes and the drain electrodes are strictly changed to each other according to the operation state. However, in the present specification, for the convenience of understanding the present invention, one side electrodes of the respective transistors are assigned to the source electrodes and other electrodes are assigned to the drain electrodes.

Figure 16:
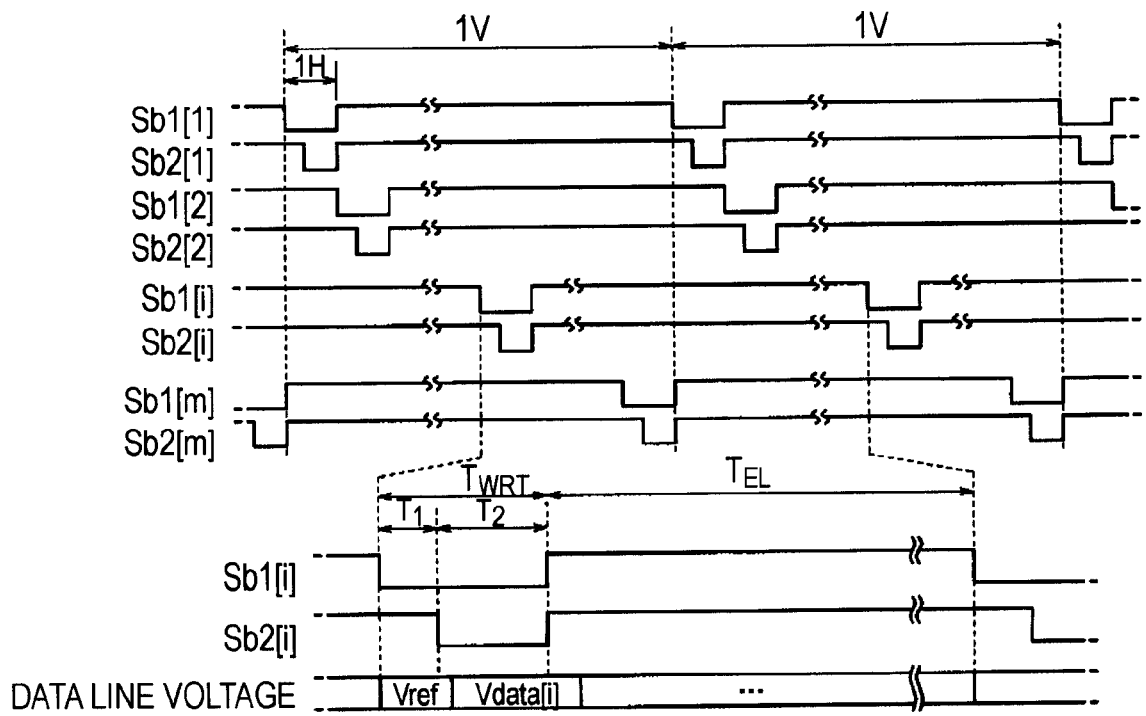
FIG. 16 is a timing chart illustrating the waveforms of signals supplied to the pixel circuit.

Next, FIG. 16 is a timing chart illustrating the waveforms of first control signals Sb1[1] to Sb1[m] and second control signals Sb2[1] to Sb2[m] in the present embodiment. As shown in this drawing, the ith horizontal scan time 1H of the respective vertical scan time 1V is used as the writing time $T_{WRT}$ when the compensation of the threshold voltage Vth of the driving transistor Qdr and the insertion of the data voltage Vdata are performed in the respective pixel circuits 401 in the ith raw, and other time is used as the driving time TEL when OLED devices 430 of the respective pixel circuits 401 illuminate. The first control signals Sb1[1] to Sb1[m] are signals that are sequentially low level for every writing time $T_{WRT}$ when the respective rows are selected. In other words, the first control signals Sb1[1] to Sb1[m] become L-level for the writing time $T_{WRT}$ when the ith raw is selected, and become H-level for other time (the driving time $T_{EL}$ corresponding to the ith raw). The writing time $T_{WRT}$ is distinguished into a first time T1 for compensating the threshold voltage Vth of the driving transistor Qdr and a second time T2 for inserting the data voltage Vdata into the pixel circuit 401. As shown in FIG. 16, the second control signals Sb2[1] to Sb2[m] become low level for the second time T2 among the writing time TWRT when the first control signals Sb1[1] to Sb1[m] become L-level, and become L-level for other time (the driving time $T_{EL}$ and the first time T1).

Next, in the present embodiment, the operation of the pixel circuit 401 will be described separately for the first time T1 and the second time T2 of the writing time $T_{WRT}$ and the driving time $T_{EL}$. Moreover, hereinafter, although operation of the jth pixel circuit 401 of the ith raw will be specifically described, other pixel circuits 401 are like that.

(a) First time T1 (writing time $T_{WRT}$)

Figure 17:
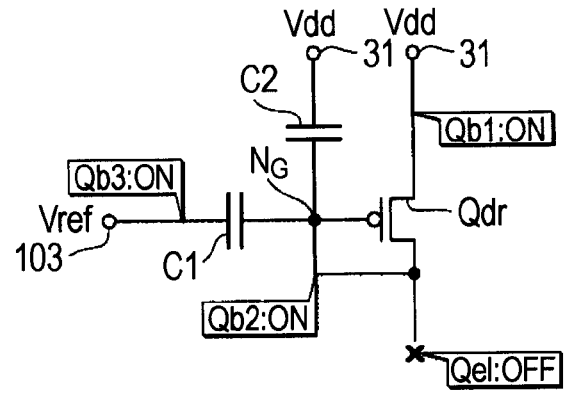
FIG. 17 is a circuit diagram illustrating the structure of the pixel circuit at a first time.

In the first time T1, since the first control signals Sb1[1] to Sb1[m] are transited to the L-level and the second control signals Sb2[1] to Sb2[m] maintain the high level, as shown in FIG. 17, the first transistor Qb1, the second transistor Qb2, and the third transistor Qb3 are turned on, and a light-emitting control transistor Qe1 is turned off. Therefore, for the first time T1, the voltage $V_G$ of the connecting point $N_G$ between the gate electrode of the driving transistor Qdr and the first capacitor C1 is converged to the difference value (VG=Vdd−Vth) between the power supply voltage Vdd and the threshold voltage Vth of the driving transistor Qdr. Meanwhile, for the first time T1, to the data line 103, a predetermined voltage Vref (hereinafter referred to "reference voltage") is applied. The reference voltage Vref is applied to the second electrode L1b of the first capacitor C1 through the turned on third transistor Qb3. The reference voltage Vref, for example, is Vss or Vdd.

(b) Second time T2 (Writing time $T_{WRT}$)

Figure 18:
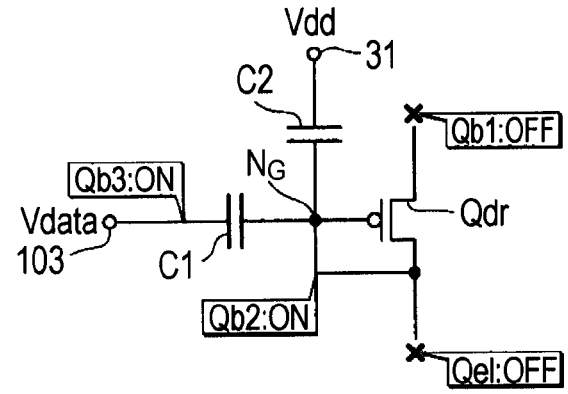
FIG. 18 is a circuit diagram illustrating the structure of the pixel circuit at a second time.

For the second time T2, since both of the first control signals Sb1[1] to Sb1[m] an the second control signals Sb2[1] to Sb2[m] maintain the L-level, as shown n FIG. 18, all of the first transistor Qb1 and the light-emitting control transistor Qe1 is turned off. Therefore, the power supply line 31 is electrically disconnected from the driving transistor Qdr, and the path of electric current from the power supply line to the opposite electrode 32 via the OLED device 430 is interrupted. Since the electric current does not flow through the pixel circuit 401 in this state from the power supply line 31, the voltage drop is not generated in the power supply line 31. Therefore, it is possible to high precisely apply a desired voltage to the second electrode L2b of the second capacitor C2 disposed between the power supply line 31 and the connection point $N_G$.

Moreover, for the second time T2 when the second control signal Sb2[i] becomes L-level, the data voltage Vdata based on the gradation of the pixel circuit 401 in the ith raw is applied to the data line 103. As shown in FIG. 18, since the third transistor Qb3 at this time is turned on by the low-level first control signal Sb1[i], the data voltage Vdata is applied to the second electrode L1b of the first capacitor C1 through the third transistor Qb3. In other words, the voltage of the second electrode L1b varies from the reference voltage Vref determined in the first time T1 to the data voltage Vdata. When the voltage of the second electrode L1b varies as much as ΔV (ΔV=Vref−Vdata), the voltage $V_G$ of the gate electrode of the driving transistor Qdr varies as much as a level that the voltage variation ΔV at the second electrode L1b is divided by the capacity coupling between the first capacitor C1 and the second capacitor C2, according to the ratio between the electrostatic capacity Ca of the first capacitor C1 and the electrostatic capacity of the second capacity C2, from the immediately before voltage Vdd−Vth. Since the variation of the voltage $V_G$ at the connection point $N_G$ is expressed by ΔV·Ca/(Ca+Cb), the voltage $V_G$ of the connection point $N_G$ for the second time T2 is stabilized by the level expressed by the following equation (4).

$$V_G = Vdd - Vth - \Delta V \cdot Ca/(Ca+Cb) \tag{4}$$

As described above, in the present embodiment, since prior to the insertion of the data voltage Vdata the voltage of the second electrode L1b is determined as the predetermined reference voltage Vref, the voltage $V_G$ of the gate electrode of the driving transistor Qdr for the second time T2 can be rapidly determined to the level according to the data voltage Vdata.

(b) Driving Time $T_{EL}$

Figure 19:
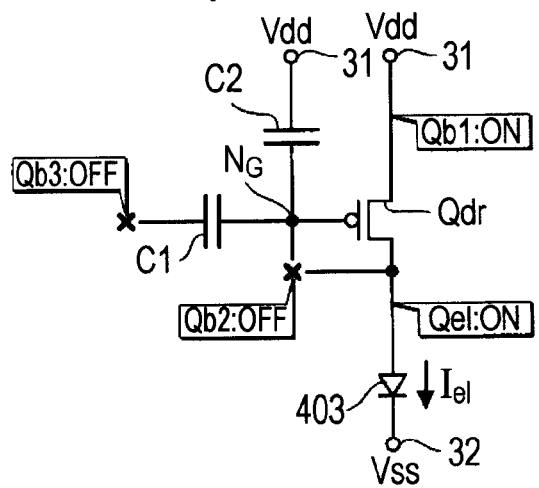
FIG. 19 is a circuit diagram illustrating the structure of the pixel circuit at a driving time.

For the driving time $T_{EL}$, both of the first control signal SB1[i] and the second control signal Sb2[i] becomes H-level. Therefore, as shown in FIG. 19, the second transistor Qb2 and the third transistor Qb3 are turned off. Meanwhile, since all of the first transistor Qb1 and the light-emitting transistor Qe1 is turned on, a path from the power supply line 31 to the opposite electrode 32 via the driving transistor Qdr and the OLED device 430 is formed. Since the voltage $V_G$ of the connection point $N_G$ for the writing time $T_{WRT}$ is maintained even at the driving time $T_{EL}$ when the second transistor Qb2 or the third transistor Qb3 is turned off, the driving Ie1 caused by the voltage between the gate and the source of the driving transistor Qdr is supplied to the OLED device 430.

At the driving time $T_{EL}$, since the voltage of the gate electrode when assuming the source electrode of the driving transistor Qdr as the reference is −(Vg−Vdd), the driving current Ie1 is expressed by the following equation (5).

$$Ie1 = (\tfrac{1}{2})\beta(Vdd - V_G - Vth)^2 \tag{5}$$

When equation (4) is substituted into equation (5), the following equation is obtained.

$$Ie1 = (\tfrac{1}{2})\beta(k \cdot \Delta V)^2 \tag{6}$$

Where k is Ca/(Ca+Cb). As expressed by the equation (6), the driving current Ie1 supplied to the OLED device 430 is determined only by the difference ΔV (=Vdd−Vdata) between the data voltage Vdata and the power supply voltage Vdd and is not dependent from the threshold voltage Vth of the driving transistor Qdr. In other words, even in the present embodiment, unbalance of the threshold voltage Vth of the driving transistor in every pixel circuit 401 is compensated so that the OLED device 430 can emit light very precisely at a desired brightness.

Figure 20:
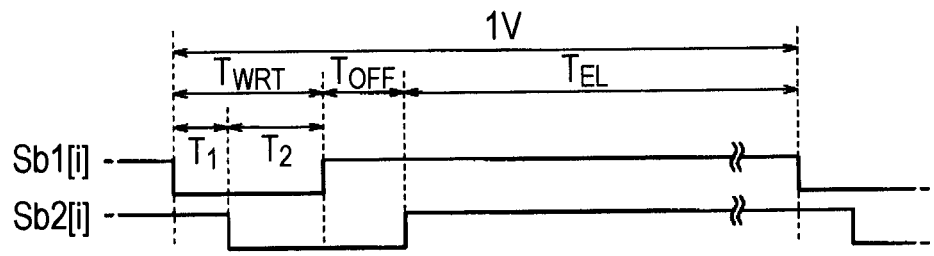
FIG. 20 is a timing chart illustrating the waveforms of signals according to another aspect.

Moreover, although, in the above-mentioned aspects of the present invention, the writing time $T_{WRT}$ and the driving time $T_{EL}$ have been described as continuously formed on the time axis, in order to securely prevent the voltage drop of the power supply line 31 at the writing time $T_{WRT}$, an idle time $T_{OFF}$ may be inserted between the writing time $T_{WRT}$ and the driving time $T_{EL}$. The idle time is a time period when the insertion of the data voltage Vdata with respect to the pixel circuit 401 and the supply of the driving current Le1 to the OLED device 430 are not carried out. For example, the second control signal Sb2[$i$] in this aspect, as shown in FIG. 20, maintains the L-level in the second time T2 of at the writing time T$_{WRT}$ and the idle time T$_{OFF}$ immediately after the writing time T$_{WRT}$ and maintains the H-level during the time from the ending point of the idle time T$_{OFF}$ to the next second time T2. Therefore, in the idle time T$_{OFF}$, since the second transistor Qb2 and the third transistor Qb3 maintained to be turned off by the H-level first control signal Sb1[$i$] (in other words, the second electrode L1$b$ of the first capacitor C1 is the floating state), the insertion of the data voltage Vdata into the pixel circuit 401 stops, and since the first transistor Qb1 maintains to be turned off by due to the L-level second control signal Sb2[$i$] (in other words, since the path from the power supply line 31 to the opposite electrode 32 is intercepted), the voltage drop is not generated in the power supply line 31. Ss shown in FIG. 16, in the structure in which the writing time T$_{WRT}$ and the driving time T$_{EL}$ are continued, although the writing time TWRT may be overlapped with the driving time T$_{EL}$ caused by the delay or wave distortion of the first control signal Sb1[$i$] or the second control signal Sb2[$i$] (in other words, when the insertion of the data into the pixel circuit 401 and the supply of the driving current Ie1 to the OLED device 430 are simultaneously performed), according to the aspect as shown in FIG. 20, the situation when the driving current Ie1 is supplied to the OLED device 430 during the insertion of the data voltage Vdata into the pixel circuit 401 can be securely prevented.

Next, other embodiments related to the present invention will be described. Moreover, in the present embodiment, proper common references are assigned to like components in the above embodiments and their description will be omitted.

Figure 21:
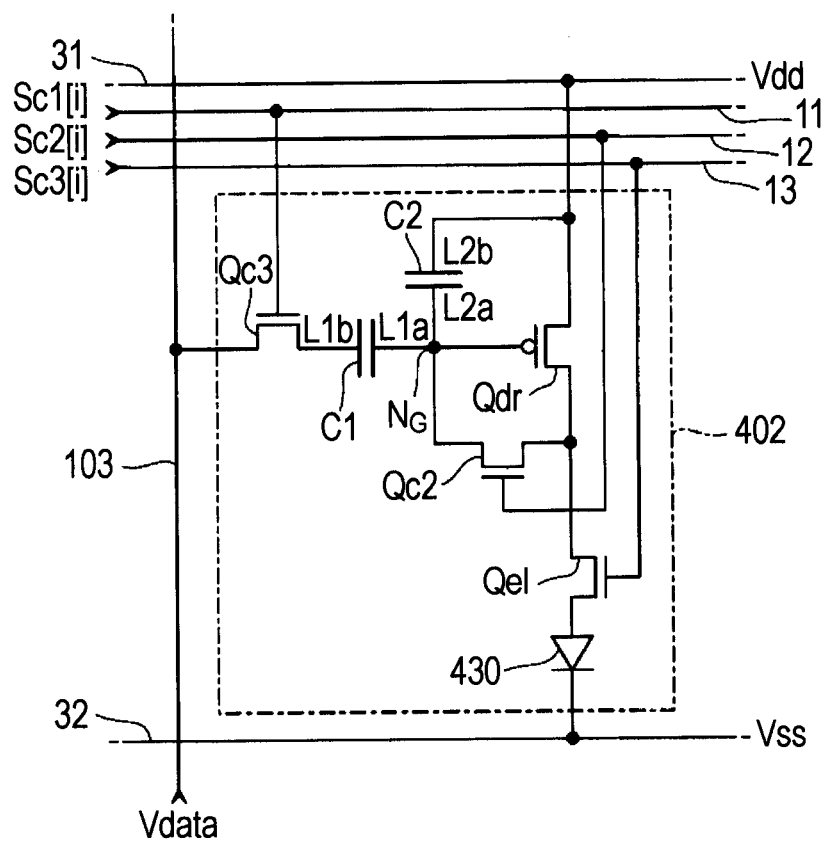
FIG. 21 is a circuit diagram illustrating another example of the pixel circuit.

FIG. 21 is a circuit diagram illustrating the structure of other pixel circuit according to the present embodiment. As shown in the drawing, in the pixel circuit 402, the first transistor Qb1 of the pixel circuit 31 in FIG. 15 is eliminated. In other words, the driving transistor Qdr is directly connected to the power supply line 31. Moreover, the gate electrode of the light-emitting control transistor Qe1 disposed between the driving transistor Qdr and the OLED device 430 is connected to the power supply line 13. Therefore, the light emitting control transistor Qe1 turns ON when the third control signal Sc3[$i$] supplied to the third control line 13 is H-level, and turns OFF when the third control signal Sc3[$i$] is L-level.

The pixel circuit 402 in the present embodiment includes, instead of the second transistor Qb2 of the pixel circuit 401 and the third transistor Qb3 in FIG. 15, re-channel type second transistor Qc2 and n-channel type Qc3. A gate electrode of the second transistor Qc2 is connected to the second control line 12 through which the second control signal Sc2[$i$] is supplied, a gate electrode of the third transistor Qc3 is connected to the first control line 11 through which the first control signal Sc1[$i$] is supplied.

Figure 22:
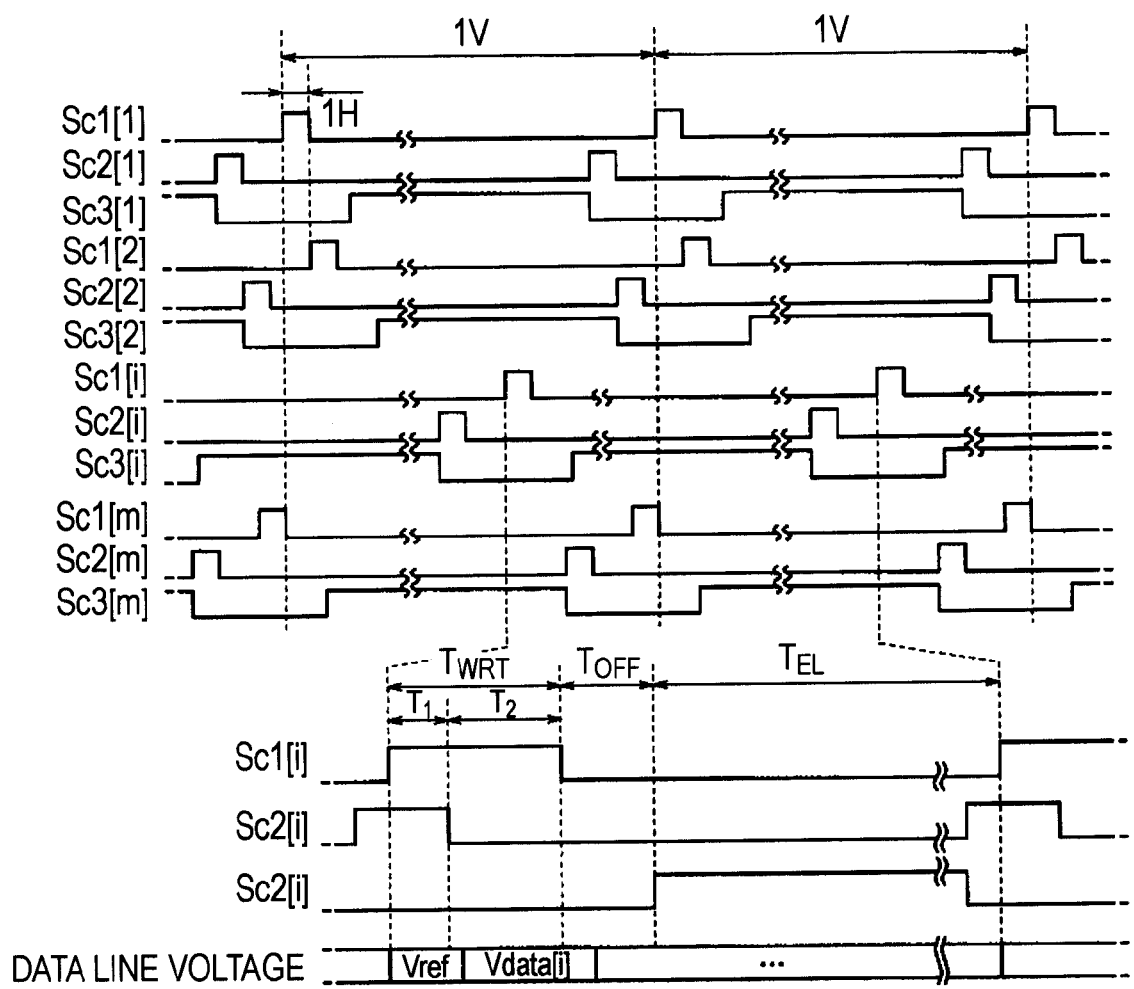
FIG. 22 is a timing chart illustrating the waveforms of signals supplied to the pixel circuit.

FIG. 22 is a timing chart illustrating waveforms of respective signals supplied to the pixel circuit 402. As shown in the drawing, the first control signal Sc1[$i$] to Sc1[$m$] sequentially become H-level in every horizontal scan time 1H. The writing time T$_{WRT}$ (horizontal scan time) when the first control signal Sc1[$i$] maintains the H-level is divided into the first time T1 and the second time T2 following the first time T1. The second control signal Sc2[$i$] is at H-level during time from time point immediately before the writing time T$_{WRT}$ by a predetermined time to the ending point of the first time T1 and is at L-level in other time. Operation in the first time T1 and the second time T2 is identical to that in FIG. 15. In other words, in the first time T1, the reference voltage is applied to the second electrode Lb1 of the capacitor C1 from the data line 103 via the third transistor Qc3 turned ON by the high level first control signal Sc1[$i$] and the second transistor Qc2 is turned ON by the high level second control signal Sc2[$i$] so that the voltage V$_G$ of the gate electrode of the driving transistor Qdr is converged to Vdd–Vth. In the second time T2, after the second transistor Qc2 is turned OFF, the data voltage Vdata is applied to the second electrode L1$b$ of the first capacitor C1 so that the voltage V$_G$ of the driving transistor Qdr is set to a level according to the data voltage Vdata.

Meanwhile, the third control signals Sc3[1] to Sc3[$m$] are signals for defining the driving time T$_{EL}$ when the OLED device 430 actually emits light according to the data voltage Vdata inserted into the pixel circuit 402 at the writing time T$_{WRT}$. In other words, a path from the power supply line 31 to the OLED device 430 is formed when the light emitting control transistor Qe1 is turned ON, and through this path, the driving current Ie1 according to the voltage V$_G$ of the gate electrode of the driving transistor Qdr is supplied to the OLED device 430.

The third control signal Sc3[$i$] in the present embodiment goes up to the H-level at a time point when the idle time T$_{OFF}$ elapses after the first control signal Sc1[$i$] goes down to the low level. In other words, even in the present embodiment, like the example in FIG. 20, the idle time T$_{OFF}$ is inserted between the writing time T$_{WRT}$ and the driving time T$_{EL}$. The idle time T$_{OFF}$ is a time period when the insertion of the data voltage Vdata into the pixel circuit 402 and the supply of the driving current Ie1 to the OLED device 430 are not performed. In other words, in the idle time T$_{OFF}$, any one of the first control signal Sc1[$i$], the second control signal Sc2[$i$], and the third control signal Sc3[$i$] become the L-level. Therefore, in the idle time T$_{OFF}$, any one of the light emitting transistor Qe1, the second transistor Qc2, and the third transistor Qc3 is turned OFF. According to the structure in which the idle time T$_{OFF}$ is inserted between the writing time T$_{WRT}$ and the driving time T$_{EL}$, the situation that the driving current Ie1 is supplied to the OLED device 430 during the insertion of data into the pixel circuit 402 is securely prevented. Therefore, the voltage drop in the power supply line 31 is restrained so that a desired data voltage Vdata can be recorded into the pixel circuit 402 in high precision.

<Electronic Apparatus>

Figure 23:
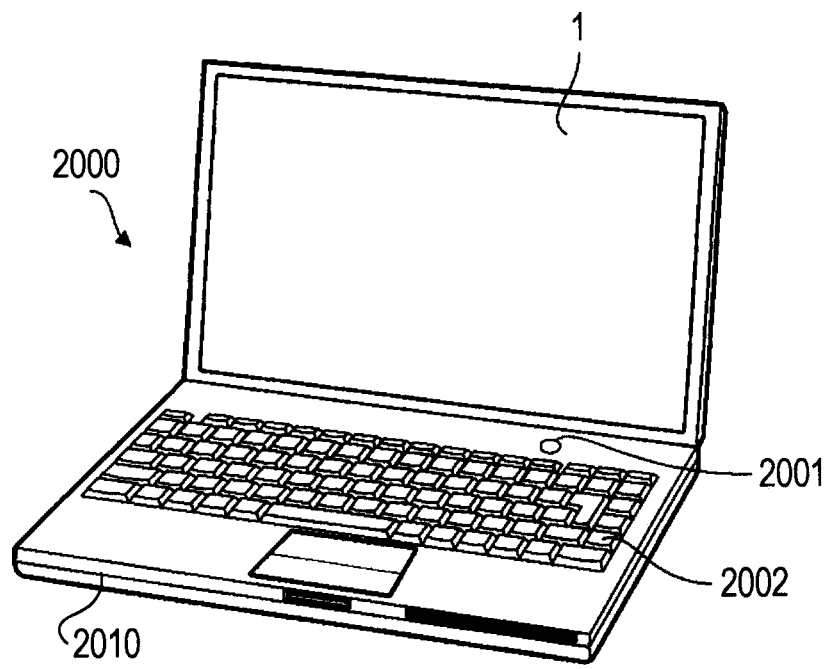
FIG. 23 illustrates a personal computer using the light emitting device.

Next, an electronic apparatus employing the light emitting device 1 related to the above-described embodiments will be described. FIG. 23 illustrates a mobile personal computer employing the light emitting device 1. The personal computer 2000 includes the light emitting device 1 as a display unit and a main body 2010. In the main body 2010, a power switch 2001 and a keyboard 2002 are installed. The light emitting device 1 can display an image with a wide viewing angle and convenient to watch because of using the OLED device 430.

Figure 24:
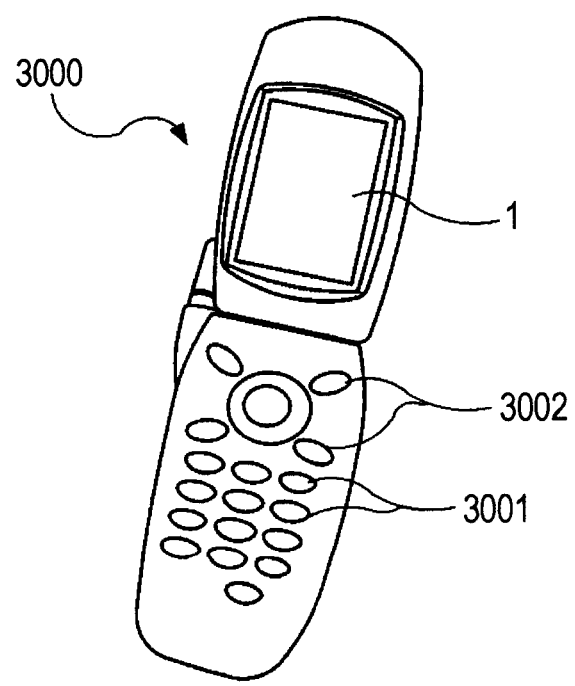
FIG. 24 illustrates a mobile telephone using the light emitting device.

FIG. 24 illustrates the structure of a mobile phone employing the light emitting device 1. A mobile phone 3000 includes a plurality of manipulation buttons 3001, scroll buttons 3002, and the light emitting device 1 as a display unit. The scroll buttons 3002 are manipulated to scroll an image displayed on the light emitting device 1.

Figure 25:
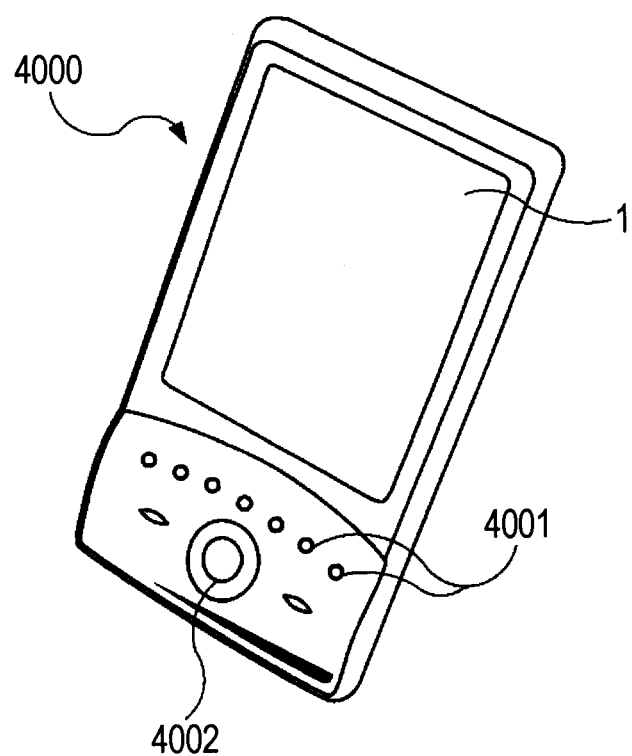
FIG. 25 illustrates a portable information terminal using the light emitting device.

FIG. 25 illustrates a personal digital assistant (PDA) employing the light emitting device 1. The PDA 400 includes a plurality of manipulation buttons 4001, a power switch 4002, and the light emitting device 1 as a display unit. When the power switch 4002 is manipulated, various information items such as an address book, a schedule table, or the like are displayed on the light emitting device 1. Moreover, as an electronic apparatus employing the light emitting device 1, other than that in FIGS. 23 to 25, there may be a digital camera, a liquid crystal TV, a viewfinder type or a monitor direct-viewing type video tape recorder, a car navigation apparatus, a pager, an electronic note, a table electronic calculator, a word processor, a workstation, an image telephone, POS terminal, an apparatus equipped with a touch panel, and the like. The light emitting device 1 can be employed in the various electronic apparatuses as a display unit. Moreover, without limit as a display unit of an electronic apparatus for displaying images and letters, the light emitting device may be uses as a light source of a printing apparatus uses in projecting light to photo sensitive object to form images or letters thereon indirectly.

The invention claimed is:

1. An electro-optical device, comprising:
   a plurality of scan lines;
   a plurality of data lines;
   a plurality of pixel circuits provided to correspond respectively to intersections between the plurality of scan lines and the plurality of data lines;
   a power supply line;
   one or more control lines; and
   one or more driver circuits configured to transmit a scan signal through one or more ones of the plurality of scan lines, and configured to transmit a control signal through one or more ones of the one or more control lines,
   wherein each of the plurality of pixel circuits comprises:
      an electro-optical device;
      a driving transistor for controlling a current level of a driving current supplied to the electro-optical device, the driving transistor having a first gate;
      a capacitor whose one end is connected to the first gate of the driving transistor and the other end of which is connected to the power supply line;
      a first transistor having a second gate, and being provided between one data line of the plurality of data lines and the first gate so that the first gate is directly connected to a source of the first transistor and a drain of the first transistor is directly connected to the one data line, the second gate is connected to one scan line of the plurality of scan lines and that the first transistor is turned on when the scan signal supplied through the scan line is activated and is turned off when the scan signal is deactivated; and
      a second transistor serially connected to the electro-optical device, and having a third gate that is connected to one control line of the one or more control lines and configured such that the second transistor is turned on when the control signal supplied through the control line is activated and is turned off when the control signal is deactivated,
   wherein the one or more driver circuits are configured to transmit the control signal and the scan signal with such timing that a pulse width of the control signal at a high level is larger than a pulse width of the scan signal at a high level.

2. The electro-optical device as claimed in claim 1, wherein the control signal is deactivated at the point of time when the scan signal transitions from the state of being activated to the state of being deactivated.

3. The electro-optical device as claimed in claim 1, wherein the time at which the control signal is deactivated is larger than the time at which the scan signal is activated.

4. An electronic apparatus having the electro-optical device as claimed in claim 1.

5. A pixel circuit, comprising:
   an organic light emitting diode (OLED) device;
   a driving transistor for controlling a current level of a driving current supplied to the OLED device, the driving transistor having a first gate;
   a capacitor whose one end is connected to the first gate of the driving transistor and the other end of which is connected to a power supply line;
   a first transistor having a drain and a second gate, and being provided between a data line and the first gate so that the first gate is directly connected to a source of the first transistor and a drain of the first transistor is directly connected to the data line, the second gate is connected to a scan line and that the first transistor is turned on when a scan signal supplied through the scan line is activated and is turned off when the scan signal is deactivated; and
   a second transistor serially connected to the OLED device, and having a third gate that is connected to a control line and configured such that the second transistor is turned on when a control signal supplied through the control line is activated and is turned off when the control signal is deactivated,
   wherein the pixel circuit is connected to a driving circuit configured to transmit the control signal and the scan signal with such timing that a pulse width of the control signal at a high level is larger than a pulse width of the scan signal at a high level.

* * * * *